United States Patent
Gharabegian

(10) Patent No.: US 11,817,730 B2
(45) Date of Patent: Nov. 14, 2023

(54) ASSEMBLY TO PROTECT PERSONAL BELONGINGS AND CHARGE MOBILE COMMUNICATION DEVICES

(71) Applicant: Shadecraft, Inc., Pasadena, CA (US)

(72) Inventor: Armen Gharabegian, Glendale, CA (US)

(*) Notice: Subject to any disclaimer, the term of this patent is extended or adjusted under 35 U.S.C. 154(b) by 202 days.

(21) Appl. No.: 17/013,735

(22) Filed: Sep. 7, 2020

(65) Prior Publication Data

US 2021/0075238 A1  Mar. 11, 2021

Related U.S. Application Data

(60) Provisional application No. 62/908,576, filed on Sep. 30, 2019, provisional application No. 62/899,729, filed on Sep. 12, 2019, provisional application No. 62/897,986, filed on Sep. 9, 2019, provisional application No. 62/897,325, filed on Sep. 7, 2019.

(51) Int. Cl.

| | |
|---|---|
| H02J 7/00 | (2006.01) |
| H02J 7/35 | (2006.01) |
| A45B 23/00 | (2006.01) |
| E05B 47/00 | (2006.01) |
| E05B 65/00 | (2006.01) |
| H04B 1/38 | (2015.01) |
| E05G 1/04 | (2006.01) |
| E05F 15/77 | (2015.01) |
| G06Q 30/0645 | (2023.01) |

(52) U.S. Cl.
CPC ......... *H02J 7/0045* (2013.01); *A45B 23/00* (2013.01); *E05B 47/0001* (2013.01); *E05B 65/0075* (2013.01); *E05F 15/77* (2015.01); *E05G 1/04* (2013.01); *H02J 7/0013* (2013.01); *H02J 7/0044* (2013.01); *H02J 7/35* (2013.01); *H04B 1/38* (2013.01); *A45B 2023/0012* (2013.01); *A45B 2200/1027* (2013.01); *A45B 2200/1054* (2013.01); *E05B 2047/0084* (2013.01); *E05Y 2400/628* (2013.01); *E05Y 2400/66* (2013.01); *E05Y 2900/21* (2013.01); *E05Y 2900/602* (2013.01); *G06Q 30/0645* (2013.01)

(58) Field of Classification Search
CPC ...... H02J 7/0045; H02J 7/0013; H02J 7/0044; H02J 7/35; A45B 23/00; A45B 2023/0012; A45B 2200/1027; A45B 2200/1054; E05B 47/0001; E05B 65/0075; E05B 2047/0084; E05F 15/77; E05G 1/04; H04B 1/38; E05Y 2400/628; E05Y 2400/66; E05Y 2900/21; E05Y 2900/602; G06Q 30/0645
USPC ........................................................ 320/101
See application file for complete search history.

(56) References Cited

U.S. PATENT DOCUMENTS

| | | | |
|---|---|---|---|
| 10,393,415 B1 * | 8/2019 | Partee | H02J 7/35 |
| 2016/0302580 A1 * | 10/2016 | Edelman | E05B 47/0001 |
| 2019/0145153 A1 * | 5/2019 | Edelman | A47C 1/143 |
| | | | 297/188.01 |

* cited by examiner

*Primary Examiner* — Zixuan Zhou

(57) ABSTRACT

A protection and/or charging assembly includes a power apparatus, a protection housing, a charging apparatus and/or a locking assembly. The power apparatus provides electrical power to components of the protection and/or charging assembly. The protection housing houses one or more personal belongings and/or electronic devices. The charging apparatus receives power from the power apparatus and charges the one or more electronic devices. The locking assembly locks and/or unlocks the protection housing and allows the one or more personal belongings to be stored in an interior of the protection housing.

12 Claims, 20 Drawing Sheets

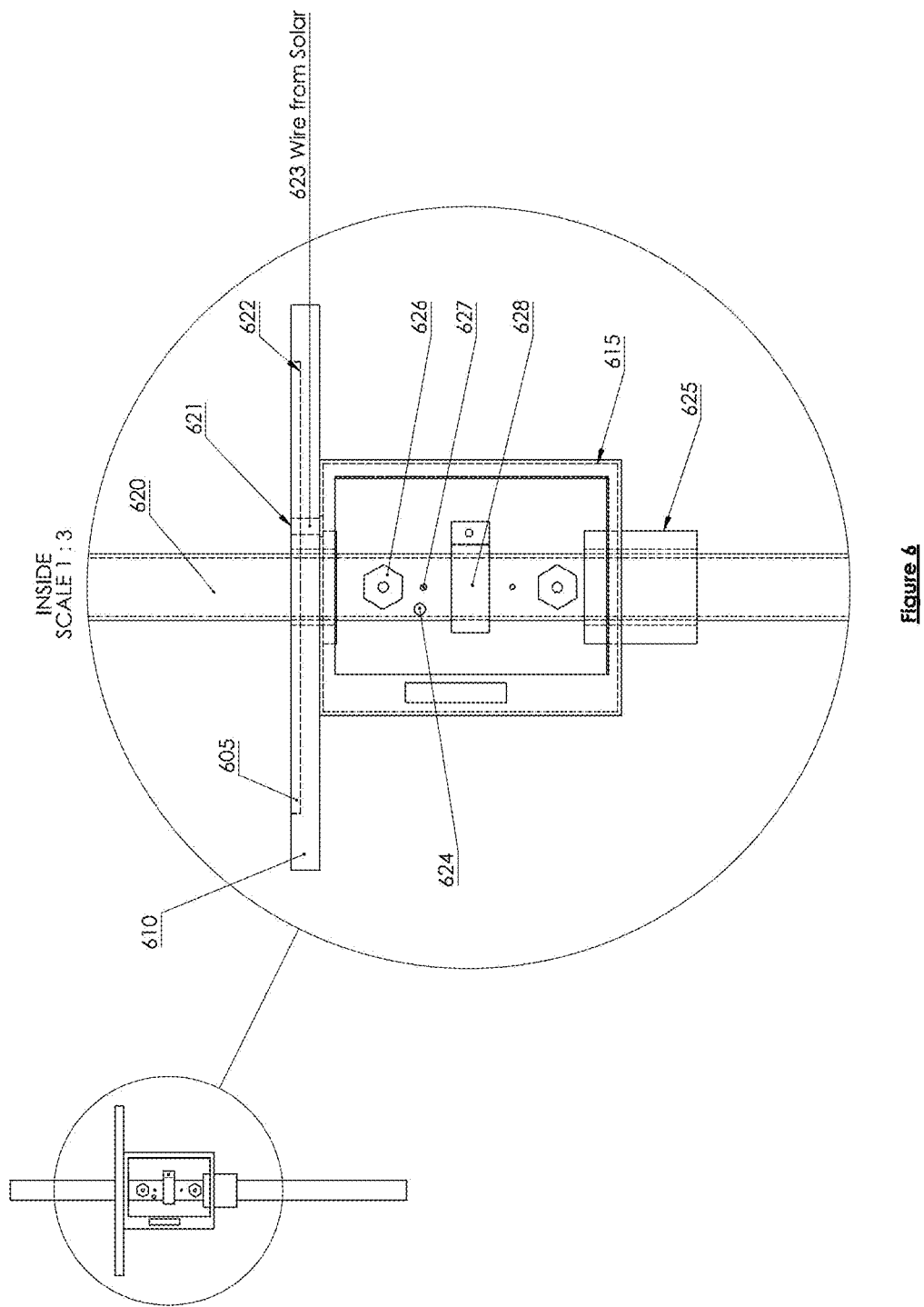

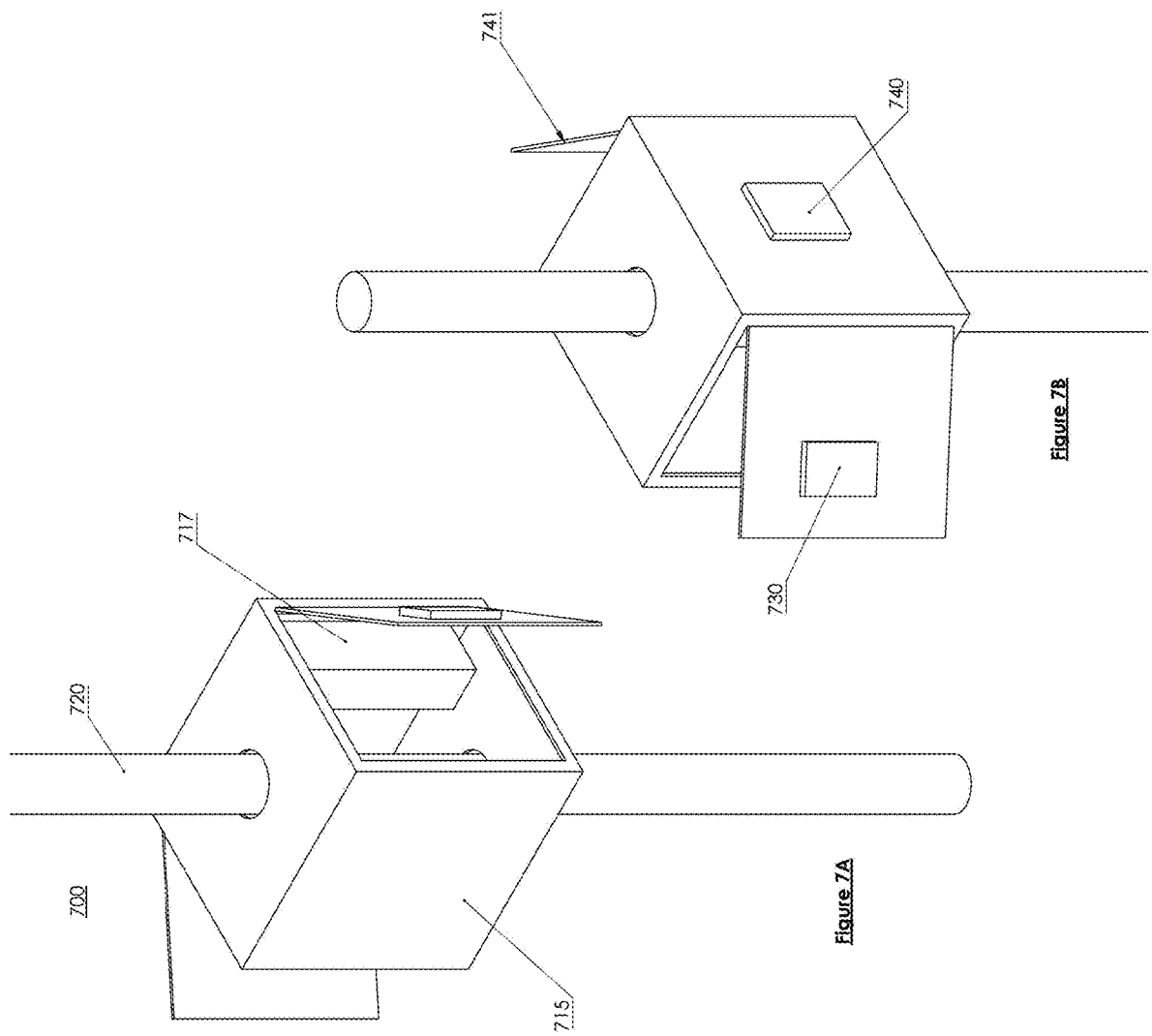

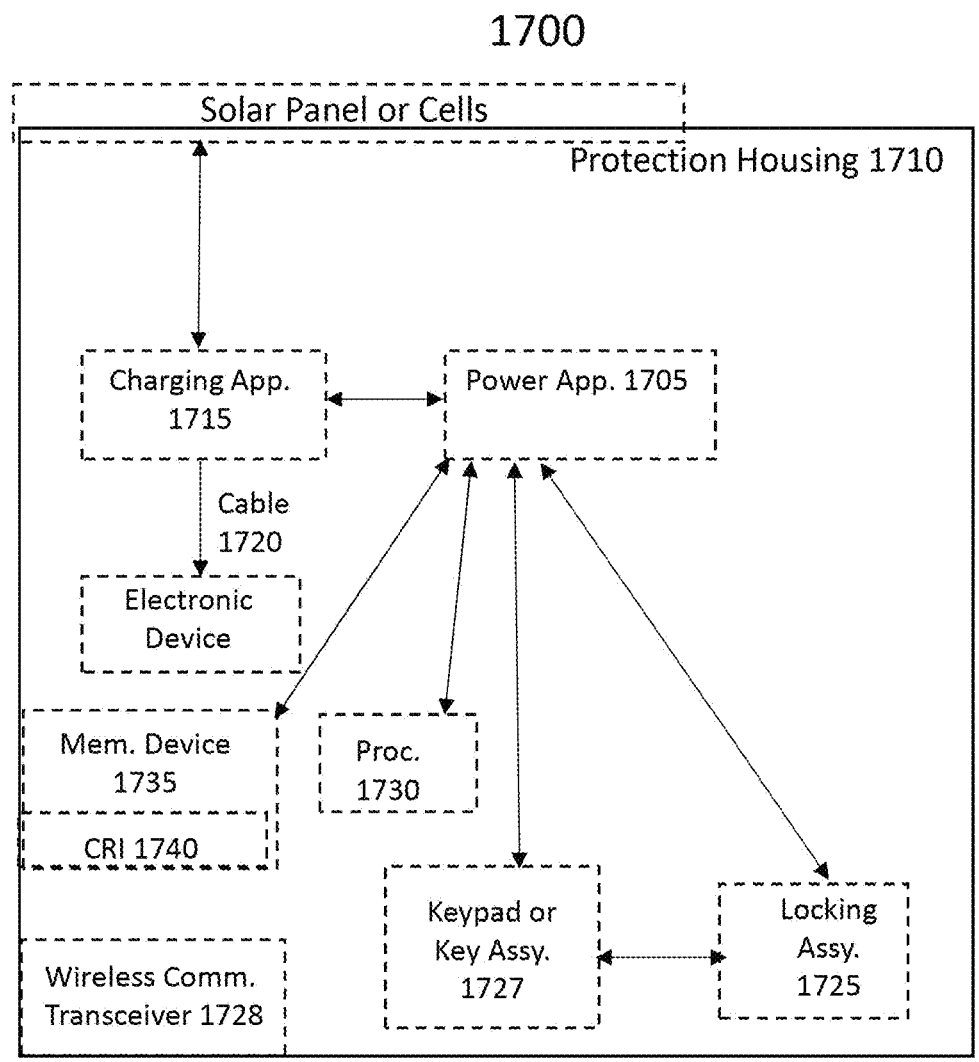
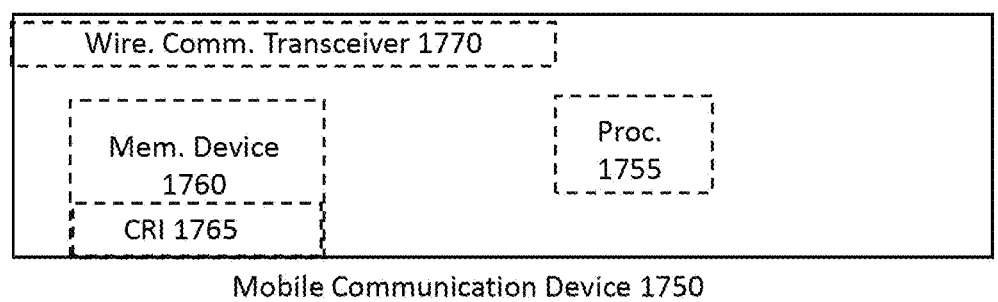
Figure 17

ASSEMBLY TO PROTECT PERSONAL BELONGINGS AND CHARGE MOBILE COMMUNICATION DEVICES

RELATED APPLICATIONS

This application claims priority to U.S. provisional patent application Ser. No. 62/897,325, filed Sep. 7, 2019; U.S. provisional patent application Ser. No. 62/897,986, filed Sep. 9, 2019; U.S. provisional patent application Ser. No. 62/899,729, filed Sep. 12, 2019; and U.S. provisional patent application Ser. No. 62/908,576. Filed Sep. 30, 2019, the disclosures of which are all hereby incorporated by reference.

BACKGROUND

When individuals engage in outdoor activities, they can be protected from the sun by parasols or umbrellas. Many outdoor activities, e.g., swimming, playing sports, gardening, etc. can be engaged in, but an issue is always present because individuals engaging in these activities do not have any place to place their valuables (e.g., wallets, watches, phones, etc.). Accordingly, a need exists to have an assembly, apparatus or device that can store and protect valuables while individuals are engaged in outdoor activities. Individuals who have mobile communication devices always need to obtain charge to keep the battery powered and the mobile communication device powered on. However, in many outdoor venues, there are no outlets available because there are no walls and/or other structures that have outlets. Accordingly, there is an need for systems to allow users to charge devices.

DESCRIPTION OF THE DRAWINGS

FIG. 6 illustrates an attachment assembly or coupling assembly for the Sunbox to attach to the existing parasol pole according to some embodiments;

FIG. 7A illustrates locations of a rechargeable battery according to some embodiments;

FIG. 7B illustrates potential locations of a keypad according to some embodiments;

FIG. 17 illustrates a protection and charging assembly according to some embodiments.

DETAILED DESCRIPTION OF THE INVENTION

Figure 1A:
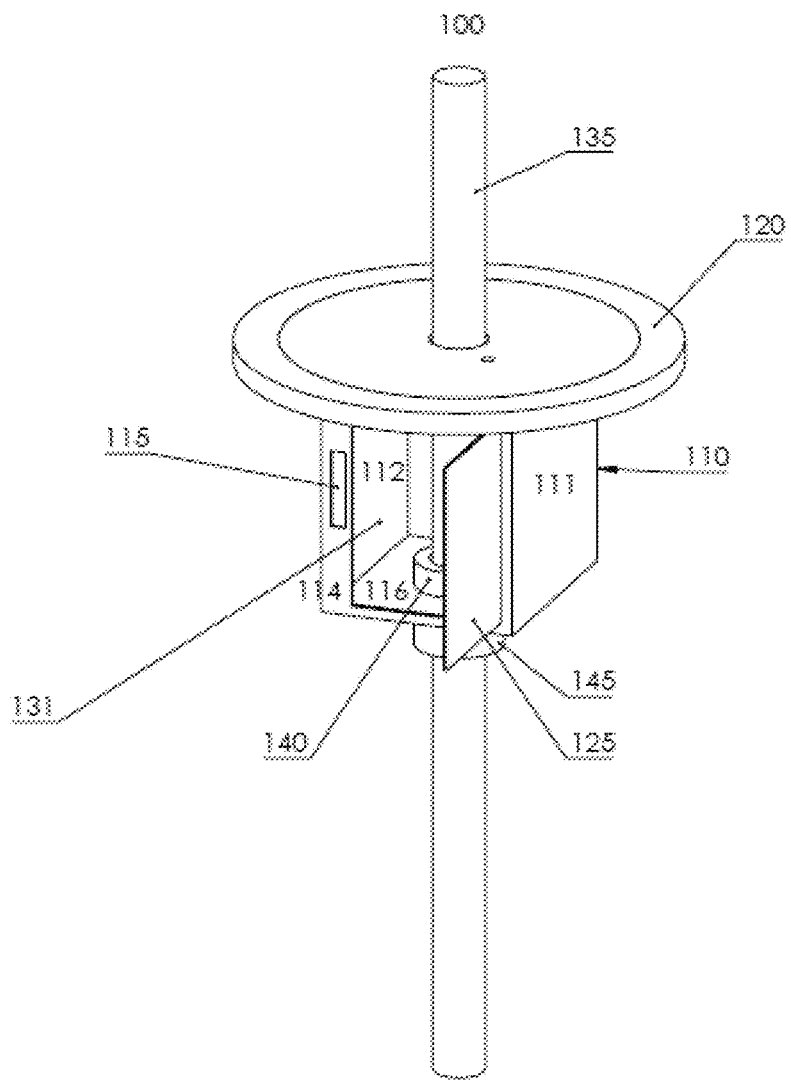
FIG. 1A illustrates a safe device attached to an existing parasol shaft according to some embodiments.

The foregoing, and other features and advantages of the invention and claimed subject matter, will be apparent from the following, more particular description of the preferred embodiments of the invention and claimed subject matter, the accompanying drawings, and the claims.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn. Mobile computing device and/or mobile communications device may be used interchangeably herein to refer to a computing device that is portable that includes computing (e.g., processing capability) and/or communications capability (e.g., both cellular and data communications).

FIG. 17 illustrates a protection and charging assembly according to some embodiments. In some embodiments, a protection and charging assembly 1700 may comprise a power apparatus 1705, a protection housing 1710, a charging apparatus 1715, a charging cable and/or wire 1720, a locking assembly 1725, a keypad or other unlocking assembly 1727, one or more wireless communication transceivers 1728, one or more processors 1730, one or more memory devices 1735 and/or computer-readable instructions 1740 (where the computer-readable instructions 1740 are stored in the one or more memory devices 1735 and accessed from the one or more memory devices 1735 and executable by the one or more processors 1730 in order to perform the actions described below). In some embodiments, the protection housing 1710 may include an interior section where a user can place their belongings (e.g., watches, wallets, glasses, keys, purses, and/or jewelry) and/or electronic devices for protection. In some embodiments, the protection housing 1710 may be attached to furniture and/or outdoor furniture. In some embodiments, the protection and charging assembly 1700 (and/or a protection housing) may be incorporated into and/or integrated within the outdoor furniture). For example, there could be a built-in structure that includes the protection and charging assembly 1700 (or portions thereof) in a table, a recliner, a couch and/or other furniture pieces (including, but not limited to, outdoor furniture pieces). In some embodiments, the protection and/or charging assembly 1700 (and/or a protection housing) may be attached to a short base assembly or stand and/or a long base assembly or stand, depending upon the location and/or use of the assembly, apparatus or device. In some embodiments, the protection and charging assembly 1700 (and/or a protection housing) may be attached to a parasol and/or umbrella. In some embodiments, the protection and charging assembly 1700 (and/or a protection housing 1710) may be incorporated into a bag or purse that may attach to an outdoor piece of furniture or other furniture. In some embodiments, a software application on a mobile communication device (or other computing device) may interface with and/or control operation of the protection and/or charging assembly 1700.

In some embodiments, a mobile communication device 1750 may comprise one or more processors 1755, one or more memory devices 1760 and/or computer-readable instructions 1765. In some embodiments, the computer-readable instructions 1765 may be stored in and then accessed from the one or more memory devices 1760 and executed by the one or more processors of the mobile communication device 1750 in order to communicate with the protection and/or charging assembly 1700 utilizing one or more wireless communication transceivers 1770 of the mobile communication device 1750. The one or more wireless communication transceivers 1770 of the mobile communication device 1750 may communicate with the one or more wireless communication transceivers 1728 in the protection and/or charging assembly 1700 in order to control operation and/or accessing of the protection and/or charging assembly 1700. The computer-readable instructions 1765 in the mobile communication device may be referred to as a software app and/or Sunbox software app. In some embodiments, the software app/Sunbox software app may allow the users to rent or lease Sunboxes for personal use (e.g., the user would not own the protection and/or charging assembly 1700 but may rent it and/or use if for a specified period of time (e.g., 1 to 2 hours or days at a time)). In some embodiments, the software app may be an application that may be purchased from software application online stores such as the Apple App Store and/or Google Play. In some embodiments, the software application also controls unlocking/locking and/or charging/not charging of the protection and/or charging assembly 1700. In some embodiments, the software app (e.g., the Sunbox app) may also control timing operations, activation operations, communication operations, unlocking and/or locking operations and/or charging and/or not charging operations.

In some embodiments, a power apparatus 1705 may provide power for operation of the protection and/or charging assembly 1700. In some embodiments, the power apparatus 1705 may be a rechargeable battery that may be repowered via a USB cable and/or a normal power outlet. In some embodiments, the power apparatus 1705 may include one or more solar cells and/or a rechargeable battery. In this embodiment, the one or more solar cells may capture sunlight and may convert the sunlight into voltage and/or current to charge the rechargeable battery of the power apparatus 1705. In some embodiments, the power apparatus 1705 may provide voltage and/or current (e.g., power) to charge electronic devices placed inside, on top of and/or attached to the protection housing 1710. In some embodiments, the power apparatus 1705 may be connected to the charging apparatus 1715 and may provide power to an electronic device (e.g., a smartphone) via a charging cable or wire 1720 (which is coupled to the charging apparatus 1715). In some embodiments, the one or more solar cells are attached to a surface of the protection housing 1710 and/or also coupled to the power apparatus 1705. In some embodiments, the solar cells may be installed or positioned on a parasol (e.g., such as a parasol pole) and connected via a wire and/or cable to the power apparatus 1705 which is resident within the protection housing 1710. In some embodiments, the solar cells may be positioned or installed on some surface of a piece of outdoor furniture and then may be connected to a power apparatus 1705 (which is resident or positioned within the protection housing 1710) via a wire and/or cable.

In some embodiments, the protection and/or charging assembly 1700 may not include a charging apparatus 1715, a charging cable and/or wire 1720 and thus may only provide protection with respect to personal belongings and/or electronic devices. In some embodiments, the protection and/or charging assembly 1700 may comprise a locking assembly 1725 and/or a keypad or other unlocking assembly 1727. In this embodiment, the keypad 1727 may be utilized to input a code in order to access an interior of the protection housing 1710. In some embodiments, the locking assembly 1725 may include a simple mechanical lock which allows a user to utilize a key to access the interior of the protection housing for their valuables and/or belongings. In some embodiments, the protection and/or charging assembly 1700 may include a computerized electronic locking assembly 1725 which requires a user with a mobile communication device and/or software application (e.g., the Sunbox application) to input a code or select an option to lock and/or unlock the locking assembly. In some embodiments, the software application may perform this unlocking operation automatically after time has expired with respect of the leasing and/or renting of the protection and/or charging assembly 1700.

Figure 1B:
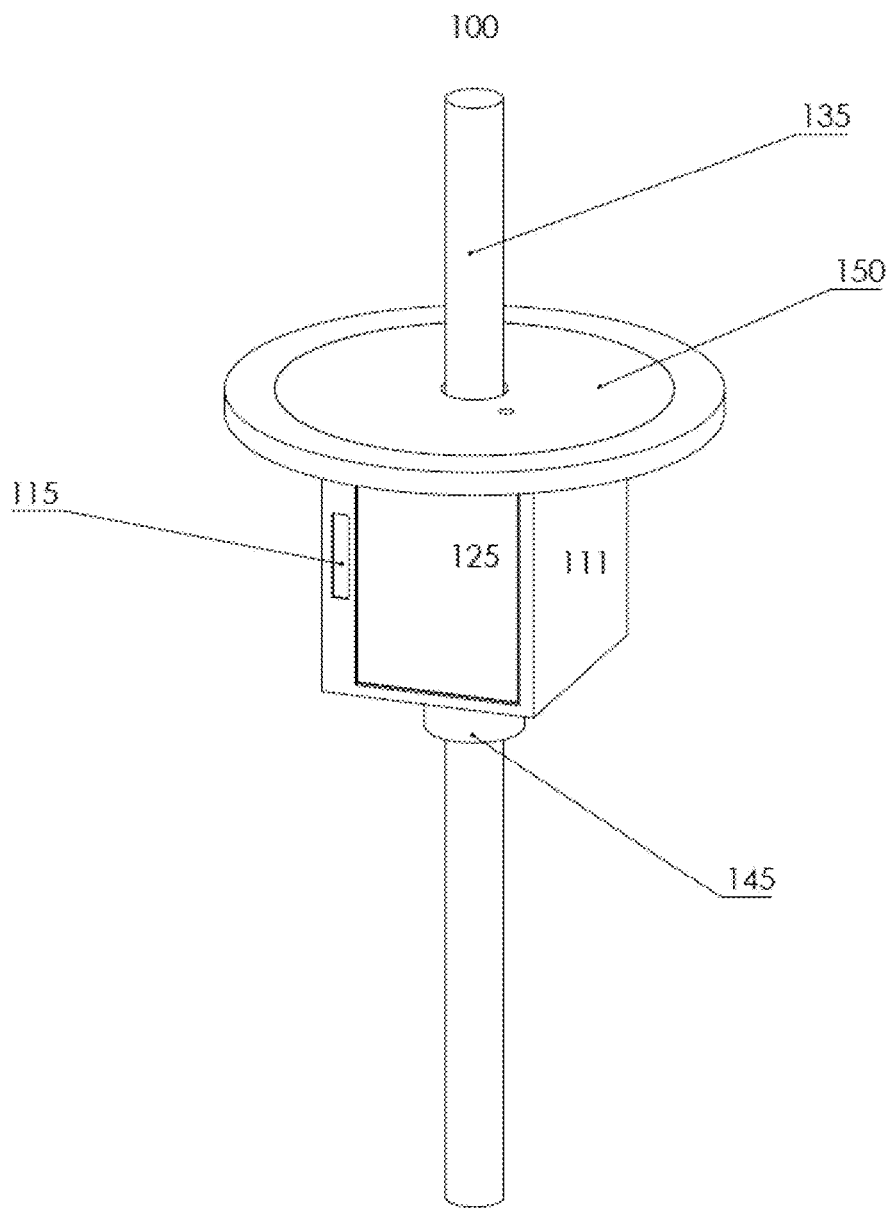
FIG. 1 B illustrates a safe device attached to an existing parasol shaft with a door closed according to some embodiments.

FIG. 1A illustrates a safe device attached to an existing parasol shaft according to some embodiments. FIG. 1B illustrates a protection mechanism or device with a door closed according to some embodiments. In some embodiments, a safe or protection apparatus or device 100 may comprise a safe housing 110, a key pad 115, and/or a top shelf 120. In some embodiments, the safe housing 110 may comprise a door 125, an opening 130 through which an existing parasol shaft or tube 135 is placed and/or positioned, and/or a tightening barrel 140. In some embodiments, the safe or protection device 100 may further comprise a tightening mechanism 145 to tighten or lock the safe housing 110 onto the existing parasol shaft or tube 135. In some embodiments, the top shelf 120 may comprise one or more solar cells or solar arrays 150.

In some embodiments, the safe housing 110 may have two or more side walls 111 and 112, a front wall 114, a rear wall (not shown), a bottom surface 116 and/or a top surface or wall (not shown). In some embodiments, one of the walls of the safe housing 110 has a door 145. In FIG. 1A, the wall (which may be a front wall) has a hinge on a side to allow the door 145 to open to one side. For example, looking at the front of the safe housing, the hinge is on the right side of the front wall 114 and the door opens to the right.

In some embodiments, the two or more side walls 111 and 112, a front wall 114, a rear wall (not shown), a bottom surface 116 and a top surface may be connected and/or coupled to each other so that a hollow area (or hollow space 131 or opening) is present in an interior of the safe housing 110. In some embodiments, the hollow area, hollow space or opening 131 may be used to hold personal belongings, valuables and/or electronic devices. In some embodiments, the door 145 may be opened or closed in order to protect the personal belongings, valuable and/or electronic devices. In some embodiments, the door 145 may be locked and/or unlocked via a locking mechanism and/or locking assembly (not shown).

In some embodiments, while a square shape is shown in FIGS. 1A and 1B, other shapes or figures may be utilized for the safe housing 110 such as a triangle, a pentagon, an oval and/or a circular shape. The description provided herein apply with equal force to these other shapes and no limitations with respect to the safe housing should be implied from the shape displayed in the figures.

FIG. 1A illustrates a keypad 115 for electronically locking the housing. In some embodiments, a code may be entered into the keypad 115, compared against the existing code, and if matching the existing code, may open a locking mechanism (or unlock the locking mechanism or assembly) to allow access to the interior of the safe housing 110 (or prevent access to the interior of the safe housing 110). In some embodiments, there may be a master access code that can be utilized to access all of the products on the property (especially for use in, for example, the hospitality industry, a hotel or venue operator may need a master access code to access all safe devices 100 on the property or within the venue).

In some embodiments, the safe housing 110 may comprise holes or openings in a top surface and/or a bottom surface 116. In some embodiments, the holes or opening in the top surface and/or the bottom surface 116 may allow the existing parasol or umbrella pole 135 to pass through the safe housing. In some embodiments, a top shelf or shelf assembly 120 may also include a hole or opening in order for the parasol or umbrella shaft or pole to pass through the top shelf or shelf assembly 120. These holes or openings allow the protection device or apparatus 100 to attach to an existing parasol or umbrella (e.g., the shaft, tube or pole of the umbrella).

In some embodiments, the top shelf 120 may comprise one or more solar cells and/or panels 150. In some embodiments, the one or more solar cells and/or panels 150 may provide power to one or more batteries in the safe or protection apparatus or device 100. Although the top shelf or assembly 120 is illustrated as circular, the top shelf or assembly 120 may have any shape or form (e.g., square, rectangular and/or oval) as long as there is some opening to allow a shaft or pole to pass through the top shelf or assembly 120 (and thus allow the protection device or apparatus to be attached to the umbrella or parasol.

In some embodiments, the safe or protection apparatus or device 100 may be connected to a tube or shaft 135 of an existing parasol or umbrella utilizing a connection assembly, adhesives and/or fasteners. In some embodiments, the connection assembly may comprise a tightening barrel 140 and a tightening mechanism 145. In some embodiments, a user or operator may screw (clockwise or counterclockwise) the tightening mechanism 145 which may then cause the tightening barrel 140 to press against the tube or shaft 135 (and may also cause the tightening mechanism 145 to press against the tube or shaft 135). Thus, in some embodiments, this prevents the safe protection apparatus or device 100 from sliding down the pole or shaft 135 and/or also prevents individuals from trying to remove the safe or protection apparatus or device 100 from the existing parasol or umbrella.

Figure 2A:
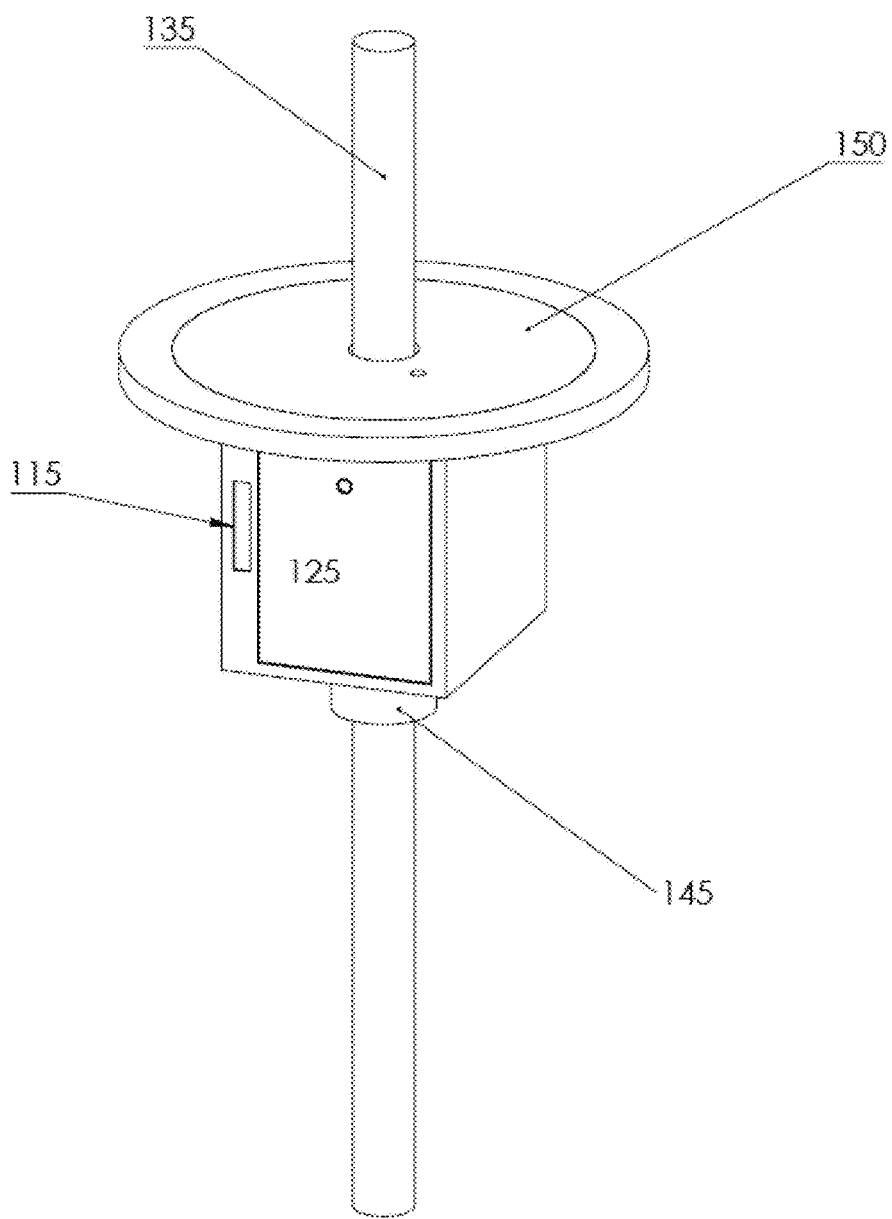
FIG. 2A illustrates a safe device attached to an existing parasol shaft according to some embodiments.
Figure 2B:
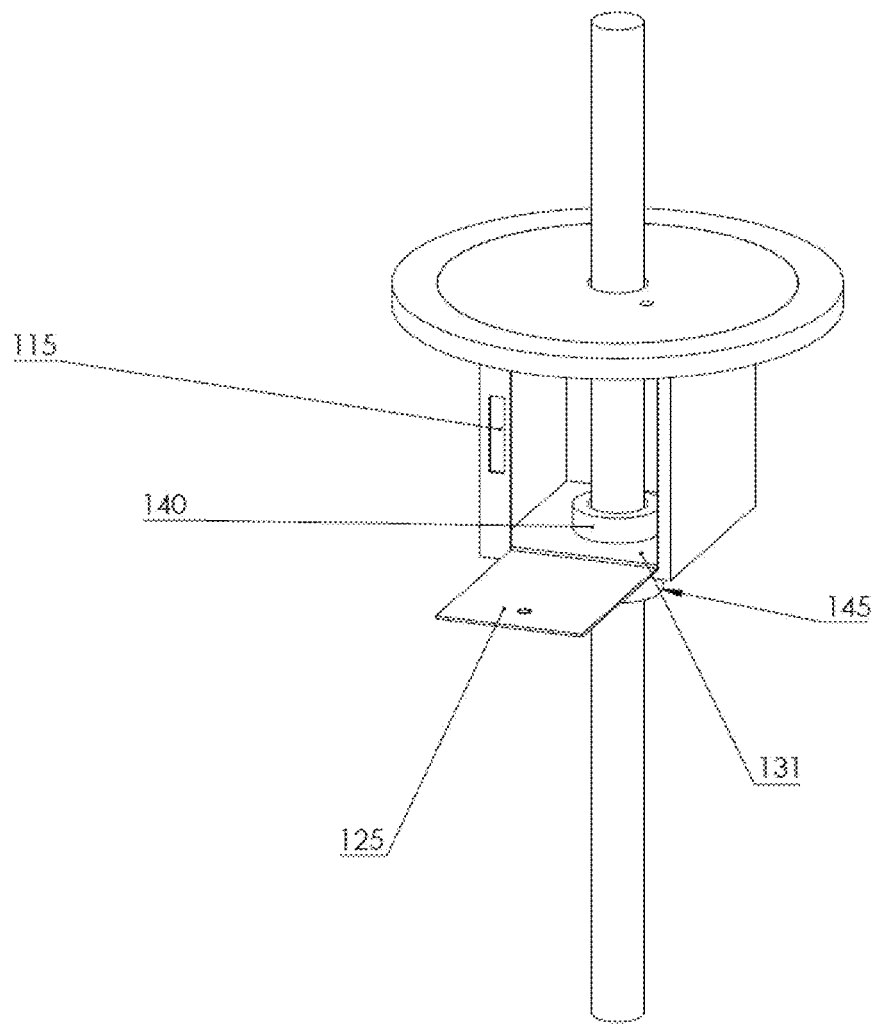
FIG. 2B illustrates a safe device attached to an existing parasol shaft with a door closed according to some embodiments.

FIG. 2A illustrates a safe or protection apparatus or device 100 with a door opening downward on the front side of the safe housing according to some embodiments. In some embodiments, the front side or wall 114 may include a hinge or hinging assembly on a bottom part of the front side or wall to allow the door 125 to swing or open downward (e.g., much like a mailbox opens downward). FIG. 2B illustrates a safe or protection apparatus or device 100 with a door closed on a front side of the safe housing according to some embodiments.

FIGS. 1A, 1B, 2A and 2B illustrates a safe or protection apparatus or device 100 having a keypad 115 for locking the safe housing 110 and preventing access from individuals who do not have an access code. In addition, a key assembly may also be utilized to prevent access to the protection device or apparatus 100 from unauthorized individuals. In some embodiments, a front door may have a key assembly to lock and prevent the door from opening unless a user utilizes the correct key in the key assembly to unlock (or lock) the lock assembly. In some embodiments, this may be utilized in a safe or protection apparatus or device 100 that does not include any electronics or electrical subassemblies. In other words, this embodiment would be a simple mechanical embodiment, and in some cases would not need to utilize solar panels because there is no need to power any electronic subassemblies or components. Thus, the safe or protection apparatus or device 100 may comprise a lock assembly and a key assembly and not need a battery or other rechargeable power source. In some embodiments, there may also be an additional key assembly and lock assembly on a back or rear wall of the safe housing 110 (which may be referred to as a master lock assembly and key assembly). In some embodiments, this could be utilized in hospitality environments (e.g., hotels, restaurants, bars) and/or other venues, where this would be a master key assembly and lock assembly to allow hospitality operators to have access to a number of safe or protection devices 100. This master key assembly and lock assembly (e.g., a second key assembly and a second lock assembly) would be the same for a number of safe housings 110 in the hospitality venues which are each attached to different umbrellas. This would allow a hospitality venue operator to be able to open any safe housings that are installed on umbrellas in the hospitality venue. In some embodiments, rather than a key assembly and lock assembly, there may be a combination lock assembly that controls access to the safe housing 110. In some embodiments, there may be a combination of two of a key and lock assembly, a keypad 115 and/or a combination lock assembly in order to provide extra security for the valuables, personal belongings and/or electronic devices.

Figure 3A:
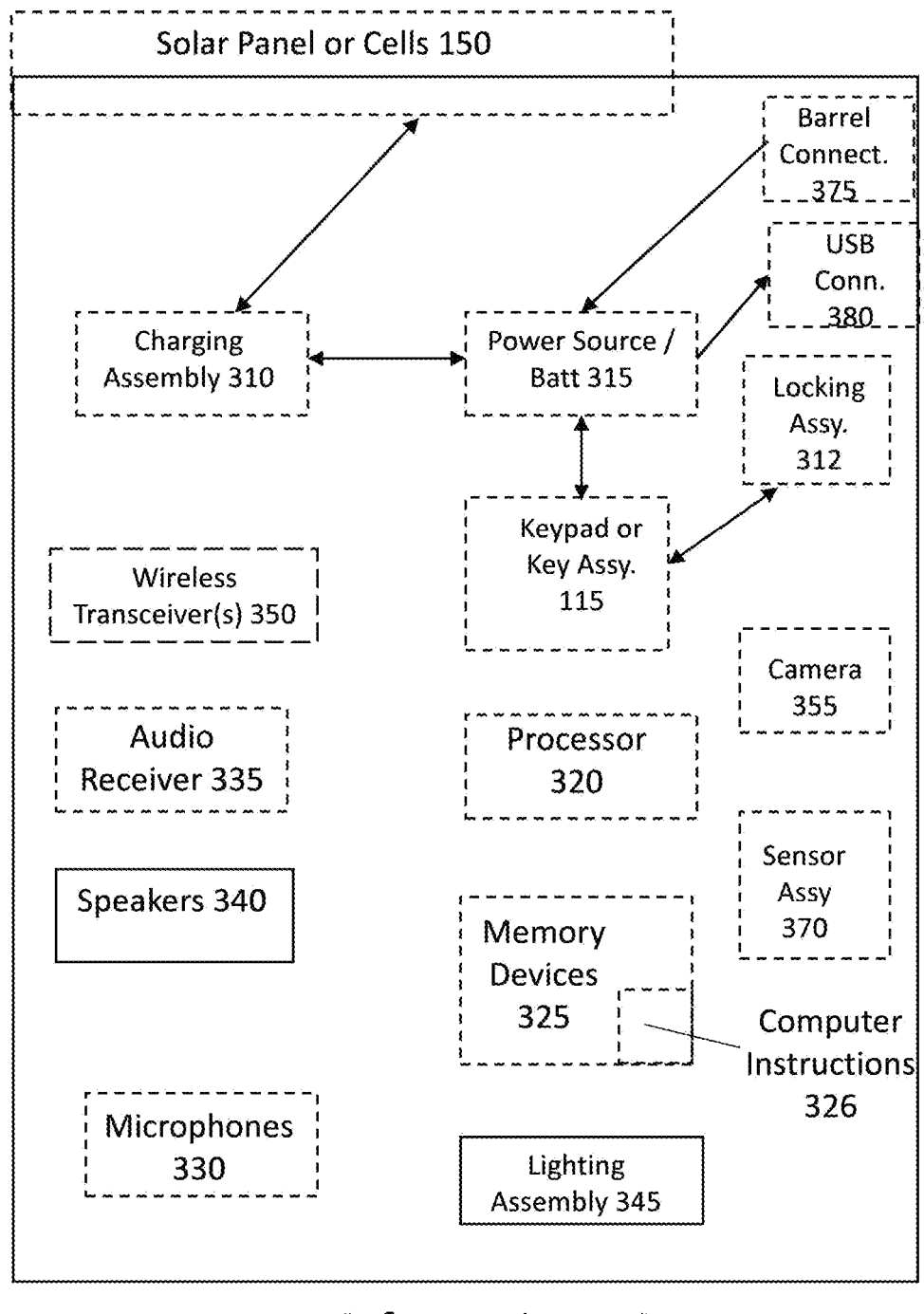
FIG. 3A illustrates a block diagram of components and assemblies in a safe or protection apparatus or device according to some embodiments.

FIG. 3A illustrates a block diagram of components and assemblies in a safe or protection apparatus or device. In some embodiments, the safe housing 110 may comprise a number of electronic or electro-mechanical assemblies or components. Although a number of components or assemblies are illustrated in FIG. 3, safe housings 110 may only include some or a few of the electronic or electro-mechanical assemblies or components or may include most or all of the electronic or electro-mechanical assemblies or components. Thus, the safe housing 110 may have many different configurations. In some embodiments, the one or more solar panels or cells 150 may provide power to a charging assembly 310. In some embodiments, the charging assembly 310 may provide power (e.g., voltage and/or current) or transfer power to a power source and/or rechargeable battery 315. In some embodiments, this results in the one or more solar panels or cells 150 providing power for the electrical or electro-mechanical components of the safe or protection apparatus or device 100.

In some embodiments, the rechargeable battery 315 may provide power to the keypad 115. In some embodiments, in response to the right or matching code being entered into the keypad 115, the keypad 115 may communicate a signal and/or command to a locking assembly 312 to unlock the door 145 of the safe housing 110 and allow access to the personal belongs being stored in the safe housing. In some embodiments, if a mechanical key assembly 315 is utilized in the safe or protection apparatus or device 100, the mechanical key assembly 315 may be linked, coupled and/or connected to the lock or locking assembly 312 to allow (or prevent) access to the safe housing 110. In some embodiments, once the safe housing 100 is closed and a user's personal belongings are inside, a user may put a code in the keypad 115 in order to initiate the locking assembly 312 and lock the safe housing 110 (and protection device 100) to prevent access. In some embodiments, when the user returns, the user may enter in the pass code or password into the keypad 115 in order to open the locking assembly 312 and allow access to the user's personal belongings.

In some embodiments, the safe housing 100 may further comprise one or more processors 320, one or more memory devices 325 and/or computer-readable instructions 326 that are stored in the one or more memory devices 325 and/or executable by the one or more processors 320. In some embodiments, the computer-readable instructions 326 are executable by the one or more processors 320 to perform safe protection device or apparatus 100 operations. In some embodiments, the safe housing 110 may comprise one or more lighting assemblies 345. In some embodiments, the one or more lighting assemblies 345 may be activated or turned on manually. In some embodiments, computer-readable instructions 326 may be executable by the one or more processors 320 to turn on or activate the one or more lighting assemblies 345. In some embodiments, the safe housing 110 may comprise one or more cameras or imaging devices 355. In some embodiments, the one or more cameras or imaging devices 355 may capture pictures or images and sounds of an area around the safe housing 110. In some embodiments, the one or more cameras or imaging devices 355 may be activated manually by an operator or user. In some embodiments, computer-readable instructions 326 may be executable by the one or more processors 320 to turn on or activate the one or more cameras or imaging devices 355. In some embodiments, the computer-readable instructions 326 may be executable by the one or more processors 320 to either store the captured images, video, and/or sound in the one or more memory devices 325 and/or communicate the captured images, video and/or sound to an external computing device via the one or more wireless communication transceivers 350.

In some embodiments, the safe housing 110 may comprise one or more wireless communication transceivers 350, one or more audio receivers 335 and/or one or more speakers or assemblies 340. In some embodiments, this allows the safe housing 110 to receive audio files from external computing devices (e.g., a mobile communications device, a tablet computing device, and/or a laptop or desktop computing device) via the one or more wireless communication transceivers 350. In some embodiments, the wireless communication transceivers 350 may comprise a Bluetooth Low Energy (BLE) transceiver. In some embodiments, the one or more wireless communication transceivers 350 may be a personal area network (PAN) transceiver, a wireless local area network (LAN) or IEEE 802.11 compatible transceiver, and/or a cellular transceiver (compatible with 3G, 4G, or 5G technologies). In some embodiments, the one or more audio files may be transferred or communicated to the one or more audio receivers 335 and/or then to the one or more speakers or speaker assemblies 340 for reproduction or playback to the users. In some embodiments, the Sunbox or protection device or safe 100 may include a timer which keeps track of how long the Sunbox 100 has been utilized to protect a user's personal belongings and/or may also keep track of how long a user has been charging a mobile communication device. In some embodiments, the Sunbox or protection device or safe 100 may have two timers or timing assemblies (one timer to monitor the use as a safe and a second timer to monitor the use as a charging device).

In some embodiments, voice activation may be utilized to unlock the safe protection device or apparatus 100 (and specifically the locking assembly 312) to open the door to allow access to the personal belongings in the safe housing 110). In some embodiments, the safe protection device or apparatus 100 may comprise one or more microphones 330. In some embodiments, the one or more microphones 330 may capture audio commands or sounds from an operator or user (e.g., open safe or open). In some embodiments, computer-readable instructions 326 may be executable by the one or more processors 320 to compare the captured audio commands or sounds against known voice commands from the user and/or operator. In some embodiments, if there is a match between the stored voice commands and the captured voice commands, then computer-readable instructions executable by the one or more processors may communicate a signal or command to the locking assembly 312 to open the door on the safe housing 110. In some embodiments, voice recognition may be performed on an external computing device such as an Amazon Alexa server. In some embodiments, for example, computer-readable instructions executable by the one or more processors 320 may communicate the captured audio files to a voice recognition server computing device via the one or more wireless communication transceivers 350. In some embodiments, the voice recognition server computing device may interpret and/or recognize the commands and may generate an unlock or lock message, instruction and/or command that is transmitted back to the safe protection device or apparatus 100 via the one or more wireless communication transceivers 350. In some embodiments, computer-readable instructions 326 executable by the one or more processors 320 may then generate a signal or command to the locking assembly 312 to unlock the locking assembly 312 (or lock the locking assembly) and allow access to the personal belongings.

In some embodiments, the safe housing 110 may comprise one or more sensors or sensor assemblies 370. In some embodiments, the one or more sensor assemblies 370 may be environmental sensors, directional sensors and/or proximity sensors. In some embodiments, the one or more sensor assemblies 370 may capture sensor measurements or parameters of an area around the safe housing 110. In some embodiments, the one or more sensors or sensor assemblies 370 may be activated manually by an operator or user. In some embodiments, computer-readable instructions 326 may be executable by the one or more processors 320 to turn on or activate or turn on the one or more sensors or sensor assemblies 370. In some embodiments, the computer-readable instructions 326 may be executable by the one or more processors 320 to either store the captured sensor measurements in the one or more memory devices 325 and/or communicate the captured sensor measurements or parameters to an external computing device via the one or more wireless communication transceivers 350. In some embodiments, the lock assembly 312 may be motorized. In some embodiments, computer-readable instructions 326 executable by one or more processors 320 may communicate Sunbox or protection device 100 assembly or components parameters, messages and/or status indicators to a server computing device for monitoring (e.g., if a number of Sunboxes or protection device are in an established network).

In some embodiments, the safe housing 100 may comprise a barrel connector 375 or other incoming power connector in order to provide power to the rechargeable power source 315 of the Sunbox. This may allow an AC power source like an AC power outlet to provide power to the safe or protection device (e.g., Sunbox). In some embodiments, the safe housing may comprise one or more USB connectors 380. In some embodiments, the one or more USB connectors 380 may be located on an interior of the safe housing 100 of the Sunbox. In some embodiments, the one or more USB connectors 380 may also be located on an exterior surface of the safe housing 100 of the Sunbox. In some embodiments, the one or more USB connectors 380 may be utilized to provide power to a user or operator's mobile communication device or multiple mobile communication devices. In some embodiments, the Sunbox may thus provide a combination of protecting a user's personal belongings or goods and charging the user's mobile communication device(s). In some embodiments, the Sunbox may provide either of the protection services or the charging services.

Figure 3B:
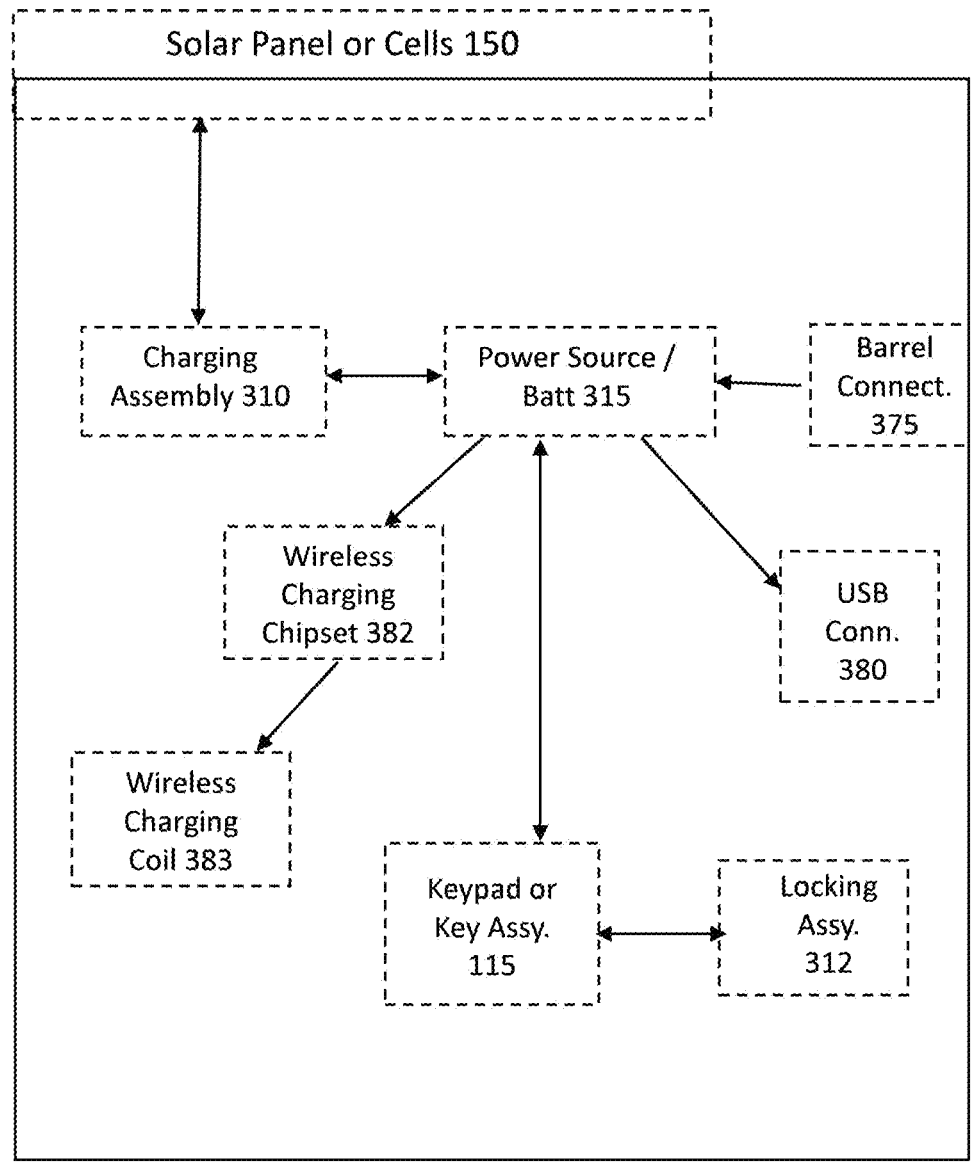
FIG. 3B illustrates a block diagram of components and assemblies for power mobile communication devices according to some embodiments.

FIG. 3B illustrates a block diagram of components and assemblies for power mobile communication devices according to some embodiments. In some embodiments, the protection and charging device 300 (e.g., Sunbox) may comprise one or more solar panels or cells 150, one or more charging assemblies 310, one or more power sources or batteries 315, one or more keypads or keypad accessories 115, and/or one or more locking assemblies 312. In some embodiments, the protection and/or charging device 300 may further comprise a barrel connector or connection assembly 375, a USB connector or connection assembly 380, a wireless charging chipset or circuit components 382 and/or a wireless charging transmitting coil 383. In some embodiments, the one or more solar panels or cells 150 may convert light energy into electrical energy and may communicate the power or electrical energy to one or more charging assemblies 310. In some embodiments, the one or more charging assemblies 310 may transfer power (e.g., voltage and current) to a power source 315, such as one or more rechargeable batteries 315. In some embodiments, the power source 315 (e.g., one or more rechargeable batteries) may provide power to components and/or assemblies of protection and/or charging device or apparatus 300. In some embodiments, the one or more barrel connectors 375 may receive power from an external source (e.g., such as a AC power source) and may also transfer power to the power source (e.g., one or more rechargeable batteries) 315. In some embodiments, the one or more rechargeable batteries 315 or power source may provide power to a USB connector 380. In some embodiments, the USB connector 380 may be coupled, connected or attached to mobile communication devices in order to charge and/or provide power to the mobile communication device. In some embodiments, the protection and/or charging device 300 may provide wireless charging through inductive charging or resonance charging. In some embodiments, the power source and/or one or more batteries may provide power to the wireless charging chipset or circuitry 382. In some embodiments, the wireless charging chipset 382 may generate a current and the current may be transferred or communicated to the one or more wireless charging coils 383. The current passing through the one or more wireless charging coils 383 may create a magnetic field. In some embodiments, that magnetic field may be picked up or transferred to a magnetic coil on the mobile communication device, which may help charge the rechargeable battery on the mobile communication device. In some embodiments, the one or more wireless charging coils 383 may be located on an interior of the safe and charging housing 110. This provides an advantage of protecting the mobile communication device from environmental conditions, from someone taking the mobile communication device and/or from environmental conditions impacting the one or more wireless charging coils 383. In some embodiments, the one or more wireless charging coils may be covered by a non-slip pad surface. In some embodiments, the wireless communication circuitry 382 and/or the one or more wireless charging coils 383 may comprise a thermal protection sensor that monitors a temperature of wireless communication circuitry 382 and/or the one or more wireless charging coils 383 so that less current may be transferred if temperature gets too high. In some embodiments, in order to protect from foreign objects from attaching to and/or damaging conductive materials (and especially the coils), the safe and charging housing 100 (and/or the wireless communication circuitry 382 and the transmitting coils 383) may include a sensor to prevent any foreign or outside conductive materials or objects from receiving power from the transmitting coils 383 and/or the wireless communication circuitry 382.

Figure 4:
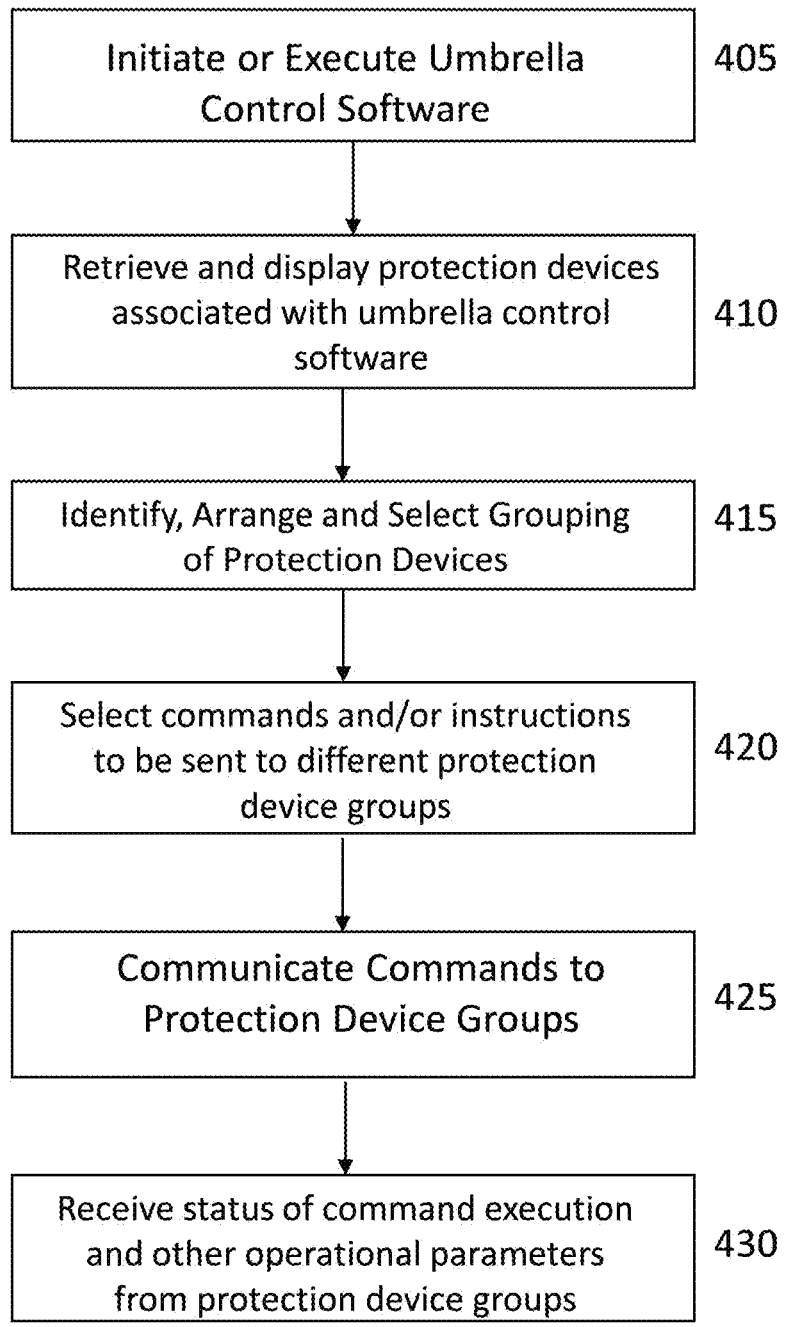
FIG. 4 illustrates a flowchart outlining a process for controlling one or more protection devices according to embodiments.

FIG. 4 illustrates a flowchart outlining a process for controlling one or more protection devices according to embodiments. Embodiments described herein are meant to be illustrative examples rather than be limiting with respect to claimed subject matter. Likewise, an embodiment may be simplified to illustrate aspects and/or features in a manner that is intended to not confuse and/or hide claimed subject matter through specificity and/or details. Embodiments in accordance with claimed subject matter may include all of, less than all, or more than blocks 405-430. In embodiments, the order of blocks 405-430 may merely be an illustrative order and other orders may be possible.

In some embodiments, computer-readable instructions executable by one or more processors or microcontrollers may perform the process described below. In some embodiments, the computer-readable instructions may be executable by one or more processors on a mobile computing device (e.g., a smartphone, a tablet, a wearable computing device), a server computing device, a desktop computing device, a laptop computing device, or a combination thereof. In some embodiments, in other words, the application software may be resident on a mobile computing device, a server computing device, a desktop computing device, or a combination thereof. In some embodiments, a graphical user interface or menu may be presented on a monitor or screen of one of the computing devices discussed above, to allow a user or operator to select items to be executed or steps to be executed. In some embodiments, a computing device or even a protection device may comprise voice recognition software to allow a user or operator to select actions and/or options to be performed via voice commands. In some embodiments, the software application may be referred to as fleet management software in a Smartshade software application.

Initially, in some embodiments, in step 405, the fleet management software may be initiated or executed. In some embodiments, the fleet management software may be able to control a number of umbrellas along with a number of protection and/or charging devices (as described herein) via one or more computing devices. In some embodiments, in step 410, a user and/or operator may be presented with protection devices that the user may communicate with and/or control. In some embodiments, a protection device group may be selected to communicate with one or more protection and/or charging devices.

In some embodiments, such as hotels, restaurants, outdoor concerts, office buildings, etc., a fleet of protection and/or charging devices, and/or shading devices may be controlled via one or more computing devices.

In embodiments, in step 415, a user or operator may identify, arrange or select groups of protection devices protection and/or charging devices (or individual protection devices), which may be selected from a list of protection and/or charging devices that are displayed through the software application. In some embodiments, a single protection and/or charging device may be selected. In other embodiments, multiple protection and/or charging devices may be selected and the same actions may be performed on all of the selected protection and/or charging devices. Alternatively, in other embodiments, multiple protection and/or charging devices and/or shading device may be selected and the software application may include a split screen, where different options and/or actions may be selected. In some embodiments, for example, a user or operator (or hospitality manager) may select to communicate with electronic protection devices, protection and/or charging devices attached to single axis parasols (e.g., expansion only parasols) in a specific geographic area such as by a pool. In some embodiments, a user and/or operator may utilize the software application (e.g., SMARTSHADE software) to set up protection and/or charging devices type (e.g., different types of SUNSAFE protection devices, etc.) and/or protection and/or charging devices product groups (e.g., based on geography or location) that the user or operator may communicate commands or instructions to.

In some embodiments, the computer-readable instructions executable by one or more processors of the one or more computing devices may display options available for the one or more protection and/or charging devices. In some embodiments, the options and/or actions may be displayed as icons, menu items, universal symbols and/or alphanumeric texts. In some embodiments, the options may include, but are not limited to: 1) settings or setup menu; 2) lighting activation/deactivation or adjusting; 3) automatic operation activation/deactivation; and/or 4) audio system activation/deactivation and/or playing of music. In other embodiments, other options may include, but are not limited to: 1) video activation/deactivation, storage and/or streaming; 2) addition sensor monitoring and/or activation/deactivation; 3) music and/or lighting system synchronization; and 4) wireless transceiver selection and/or activation deactivation.

In some embodiments, in step 420, a user or operator may select control options and/or actions for the selected protection and/or charging device(s). In some embodiments, as discussed above, the options and/or actions may be selected by touchscreen interaction, pressing mechanical/electromechanical buttons, voice commands, cursor selection and/or gesture-based selection. In some embodiments, in response to selection of control options and/or actions one of a plurality of menus or input screens may be displayed on the computing device. In some embodiments, a user or operator may select a settings or threshold menu in order to establish measurements for different assemblies or components and/or different times for activation of assemblies and/or components. In some embodiments, for example, a user or operator may select to establish or set when a protection device may be operated in an automatic mode. In embodiments, a user or operator may select a time and date at which to initiate automatic operation (e.g., 4:00 pm EST or 8:00 am PST), minutes until the protection device may initiate automatic operation (e.g., in 10 minutes or 2 hours), or under what conditions a protection device may initiate automatic operation (e.g., wind speed low, temperature reading in a specific range, and/or time of day). In some embodiments, the entered or received time, date, time period and/or environmental conditions may be stored in one or more memory devices of a computing device (e.g., mobile computing device, server computing device, wearable computing device and/or desktop computing device) and/or a memory device of the protection and/or charging device(s).

In some embodiments, in step 425, the fleet management software may communicate the selected commands to the selected protection device groups or the selected protection and/or charging devices. In some embodiments, one or more wireless communication transceiver(s) may communicate the selected commands to the selected protection device groups or the selected protection and/or charging devices. In some embodiments, the wireless communication transceiver may comprise a BLE communication transceiver. In some embodiments, the wireless communication transceiver may be another personal area network (PAN) transceiver, a wireless local area network (LAN) or 802.11 compatible wireless communication transceiver or a cellular transceiver (which may be 3G, 4G, or 5G compatible).

In some embodiments, in step 430, the fleet management software at the mobile communication device may receive status of command execution and other operational parameters from the selected protection device groups and/or the selected protection and/or charging devices. In other words, the one or more protection and/or charging devices may communicate status parameters and/or measurements or parameters to the external computing device. This is a significant advantage over any other known protection and/or charging devices because protection and/or charging devices do not engage in bidirectional communications with mobile communication devices.

Although the patent drawings of Sunbox (Protection Apparatus or Device) may show a few different models, the primary concept of the Sunbox is to store personal belongings with a keypad lock and to also include a downloadable software application that charges a user or operator (e.g., a client) for the time used or utilized. In some embodiments, the initial and most important product is the Sunbox may attach to an umbrella pole, and that it may store personal belongings and also may include can a charging port within the Sunbox (e.g., in an inside portion) and that the Sunbox may also include a battery. In some embodiments, the Sunboxes may have a key in the back in case batteries (e.g., replaceable and/or rechargeable) may need to be replaced.

The overarching goal for this product is to expand Sunbox into outdoor lockers that are attached to poles located within beaches, resorts, etc, and other hospitality venues. In some embodiments, the way the Sunbox product charges the battery inside is through solar cells or solar arrays. However, the Sunbox product may also be plugged in. In some embodiments, the rechargeable batteries may also be removed and may also be rechargeable. In some embodiments, the solar cell surface (where the solar cells or solar arrays) may be also on top of the Sunbox, but also, as you can see in the drawings, there is a version with a solar charger on top of umbrellas with a power cord that either runs down the side or through the pole itself if it's hollow.

In some embodiments, a future version of the Sunbox may be an integrated umbrella with a box in the center that is pre-assembled as one unit with solar panels on top of the umbrella. In some embodiments, a motor assembly may be utilized to open and close the umbrella itself.

In some embodiments, a software application may interface with the Sunbox in order to monitor usage and/or charge for usage of the Sunbox. In some embodiments, the software application may control usage of the "keypad-controlled box" (e.g., Sunbox) that attaches to poles. In some embodiments, the software application may be initiated via QR codes that are placed on the Sunboxes. In some embodiments, the users or operators may pay either by the hour, day, or month for usage and/or rental of the Sunbox.

In some embodiments, the software application coupled to the box may perhaps be more important than the Sunbox with a key. In some embodiments, hotels may choose to provide the guest with a key, in which case these boxes "may or may not be numbered". In some embodiments, the Sunboxes may include numbers on the Sunboxes so that consumers may identify them. In some embodiments, the Sunboxes may have a wooden, aluminum, or other type of material as the top (as well as the rest of the Sunbox) instead of a solar surface (or a surface that has solar cells or solar arrays installed thereon). In some embodiments, the Sunboxes may have a hole on the inside (or interior) In some embodiments, a way to attach the Sunboxes to the existing umbrella or parasol pole is to slide the Sunboxes (e.g., and hole) through the pole. In some embodiments, the Sunboxes may be fastened, connected and/or coupled to the existing pole via a few different fastening assemblies, which would tighten the Sunboxes against the pole of an existing umbrella. In some embodiments, one of the fastening assemblies would be tightening knobs with a bolt that compresses the Sunbox against the wood or aluminum pole of an umbrella. In some embodiments, the Sunboxes may come with a bike-type clamp as a fastening assembly, where the bike-type clamp tightens around the pole. In some embodiments, and there may be one or two holes, which can be drilled into the wood or aluminum of the parasol (or pole) and screws or other fasteners may be connected or inserted into the one or two holes. In some embodiments, the Sunboxes may come with a small lighting assembly for the evening hours, so products or the personal belonging may be located or found inside, even in the dark. In some embodiments, if users or operators forget their belongings inside the Sunbox overnight, the software application, which is connected to a Shadecraft online billing system, may let the hotel or venue operator know that the personal belongings were left inside the respective locker. In some embodiments, the software application may also let the user or operator know that they may have forgotten the personal belongings inside the Sunbox.

The size of the Sunboxes may vary and the shapes will vary from square to round to provide various amounts of storage space inside the Sunbox. In some embodiments, the Sunboxes may include inductive charging. In some embodiments, the Sunbox may include a USB charging port. In some embodiments, the software application may also have a notification system to show and let the user know that the input time is up and may prompt the users to add additional payment and/or may automatically charge the user's account once the time has expired. In some embodiments, the users may have an option in the software application to buy larger blocks of time at a discount.

In some embodiments, the Sunbox may be two-part, three-part, four-part or multi-part assemblies. In some embodiments, the Sunbox may assemble in two parts sliced in half and may be bolted at the center.

In some embodiments, the keypad may be attached to the side of the Sunbox or may be attached to the door of the box. In some embodiments, the Sunbox may come with a master key to allow a manual system for unlocking.

In some embodiments, the sizes of the holes in the center of a Sunbox may vary from 2" and may include a coupler that reduces the size to the specific pole for a snug fit. In some embodiments, the sizes of the holes (e.g., the diameters of holes) may be up to 7" or 8" holes (such as those designed for palapas). In some embodiments, the Sunbox may be attached as two halves since palapas are embedded into the ground.

In some embodiments, the Sunbox may also have cameras for security purposes (e.g., in order to see what is happening in an area around the Sunbox). In some embodiments, the Sunbox may include one or more wireless communication transceivers (e.g., BLE transceivers). In some embodiments, the Sunbox may also include one or more speakers or speaker assemblies, as well as a Wi-Fi transceiver or a cellular transceiver. In some embodiments, another unique component of the Sunbox may be an external and internal cavity with an airspace between the exterior box and the interior box, allowing for transfer of heat. In some embodiments, a bottom of the Sunbox may have some perforation so that they can be easily cleaned. In some embodiments, the Sunbox materials on the exterior and the anterior of the Sunbox may be aluminum, plastic, composite materials, injection molded plastics such as glass-filled nylon, ABS, polycarbonate mixture, and/or recycled composite materials.

Suncharqe/Beetle

In some embodiments, a Beetle device may a small box with a keypad attached to a solar panel charging unit, both attaching to existing parasols. Similar to Sunbox, this Beetle unit or device, may be quite small and attached to the pole. In some embodiments, the Beetle unit or device may only be meant for charging in public areas. In some embodiments, the solar panel attachment may be located at the top of the parasol or umbrella and may have a small automation motor. In some embodiments, the automation motor may elevate the solar panels or cells of the Beetle to a 45 degree angle during the morning hours, may flatten the solar panels or cells during noon, and again may elevate the solar panels or cells to a 45 degree angle to allow for the angle of the sun in its charging process. In some embodiments, the Beetle device may have a small processor, computer-readable instructions stored in a memory device and executable by the small processor, a timer, and a motor along with a wireless transceiver (e.g., BLE). In some embodiments, the processors and/or the wireless transceiver may control a charging apparatus below. In some embodiments, the charging apparatus may have a USB charging port and/or inductive surface.

In some embodiments, the charging box, may be attached to the pole, and may have a green and red indicator light with a QR code. In some embodiments, users or operators (e.g., subscription members) may have a monthly subscription and those users may simply need to scan the QR code and press or select a button on the software application to engage the charging box device to begin charging their phone or other mobile communication device. In some embodiments, customers may be charged per hour and will have a wallet inside the software application, where they can buy a certain period of time to be able to use Beetle device in public areas. In some embodiments, the charging device on top of the umbrella may not need to be articulating (or tracking the sun). In some embodiments, the solar panel or cells may include a static solar panel with a battery underneath it without a motor in the application. In some embodiments, the Beetle may be referring to as including an articulating solar panel.

In some embodiments, the solar charging box may be an Internet-of-Things component. In some embodiments, the solar charge box may include a rechargeable battery, one or more solar panels or cells, one or more solar charge converting modules, one or more battery monitoring modules, one or more processors (or main control units), one or more Bluetooth Low Energy wireless communication modules, one or more timing devices (e.g., a RTC), one or more box status trigger switches, and/or one or more box status indicator lighting assemblies. In some embodiments, the solar charge box may comprise a buzzer or sound assembly, a button panel indication LED lighting assembly, a locker control circuit or locking assembly, a charging input port (e.g., a barrel port) and/or a charging output port (e.g., a USB charging port) or a wireless inductive charging surface.

Figure 5B:
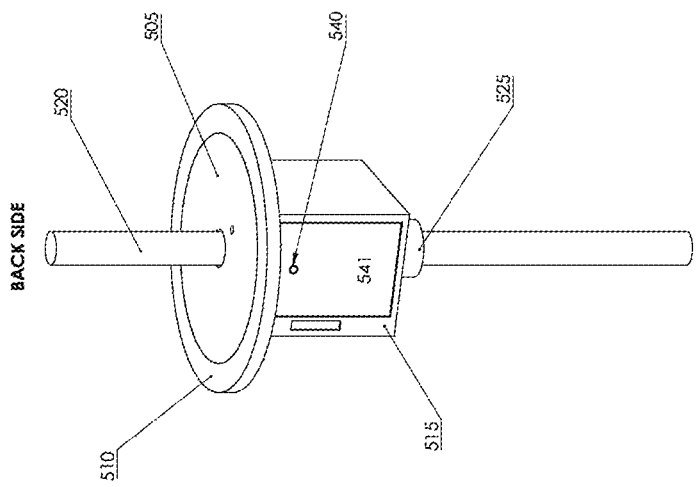
FIG. 5B illustrates a back view of a Sunbox attached to a pole or center support assembly of a parasol according to some embodiments.
Figure 5A:
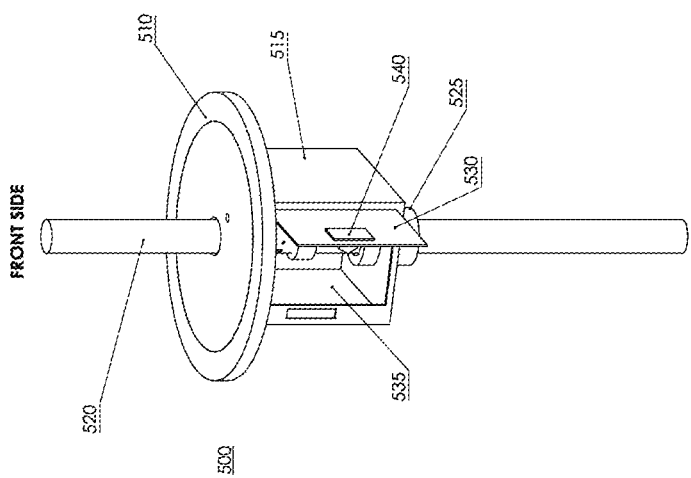
FIG. 5A illustrates a front view of a Sunbox attached to a pole or center support assembly of a parasol according to some embodiments.

FIG. 5A illustrates a front view of a Sunbox attached to a pole or center support assembly of a parasol according to some embodiments. FIG. 5B illustrates a back view of a Sunbox attached to a pole or center support assembly of a parasol according to some embodiments. In some embodiments, the Sunbox (or protection and charging device) may comprise a circular table top or table top assembly 510 and a box or housing 515. In FIG. 5A, the Sunbox may have an opening running through the center to allow a center support assembly or pole 520 to pass through the hole or opening. In some embodiments, the box or housing 515 may slip onto or be positioned onto the pole through the hole or opening. In some embodiments, the box or housing 515 (and the table top 510) may be held in place on the pole or center support assembly 520 via a tightening assembly 525. In some embodiments, the box or housing 515 may comprise a door or opening 530 to allow access to an interior 535 of the box or housing 515. In some embodiments, the door or opening 530 may include a keypad 540 to open the door or opening 530. In some embodiments, the interior 535 may include a space for a user's personal belongings. In some embodiments, the interior 535 may include a USB hub or a USB port to power one or more mobile communication devices. In some embodiments, the table top 510 may include one or more solar panels 505. In some embodiments, the table top 510 may further comprise a acrylic/polycarbonate/or glass surface (not shown) to protect the one or more solar panels 505 from the environment and/or scratching. In some embodiments, the box or housing 515 may comprise a further or additional door 541 (e.g., for example on a rear door). In some embodiments, the further or additional door 541 may comprise a key and lock assembly 540 to allow access to a back side of the interior space in the housing or box 515. In some embodiments, this may be helpful if all boxes may be opened by a master key, such as at a hospitality venue like a hotel, a park, or a concert hall.

FIG. 6 illustrates attachment, connection or coupling assemblies for the Sunbox to attach to the existing parasol pole according to some embodiments. In some embodiments, the table top 610 may comprise one or more solar panels or cells 615. In alternative embodiments, the table top 610 may not comprise one or more solar panels or cells 615. In this alternative embodiment, the one or more solar panels or cells 615 may be located on the arms or blades (or shading fabric) of a parasol (in other words above the Sunbox). In this embodiment, a wire (not shown) may run alongside the pole or center support assembly 620 or next to it and may pass through a hole 621 in the table top 610. In some embodiments, the wire may pass through the pole 620 at an opening 624 and may attach or connect to the charging assembly and/or the power source (e.g., the rechargeable battery) in the Sunbox in order to provide power to the Sunbox (protection and charging assembly) 600. FIG. 6 further illustrates additional ways for the Sunbox (and specifically the box or housing 615) to attach to the pole or center support assembly 620. In some embodiments, one or more nuts and bolts 626 may connect the box or housing 615 to the pole or center support assembly 620. In some embodiments, one or more screws 627 may connect the box or housing 615 to the pole or center support assembly 620. In some embodiments, one or more clamps 620 may connect the box or housing 615 to the pole or center support assembly 620. In some embodiments, a tightening assembly 625 may tighten and cause the box or housing 615 to the pole or center support assembly 620. These different coupling, connecting and/or attachment assemblies may be used alone or in combination with each other.

FIG. 7A illustrates locations of a rechargeable battery according to some embodiments. In some embodiments, the protection and charging apparatus or device 700 may include a box or housing 715 that is attached to a central support assembly or pole 720. In some embodiments, FIG. 7A illustrates an interior of the box or housing 715 and also that one or more rechargeable batteries 717 may be located inside the box or housing 715. In some embodiments, the one or more rechargeable batteries 717 (e.g., rechargeable power sources) may also be removable or detachable from the box or housing 715. This may allow the rechargeable batteries 717 to be removed and/or charged outside the protection and/or charging apparatus (e.g., at a docking port orr by connecting to an external power source). FIG. 7B illustrates potential locations of a keypad according to some embodiments. In some embodiments, as illustrated in FIG. 7B, a keypad 740 may be located on a door 730 on a box or housing 715 of the Sunbox (which may be a front door). In other embodiments, a keypad 740 may be located on an outer surface of another side of the box or housing 715, as illustrated in FIG. 7B. In some embodiments, a keypad 741 may be located on a back door of the box or housing 715 of the protection and charging apparatus 700, as is also illustrated in FIG. 7B.

Figure 8:
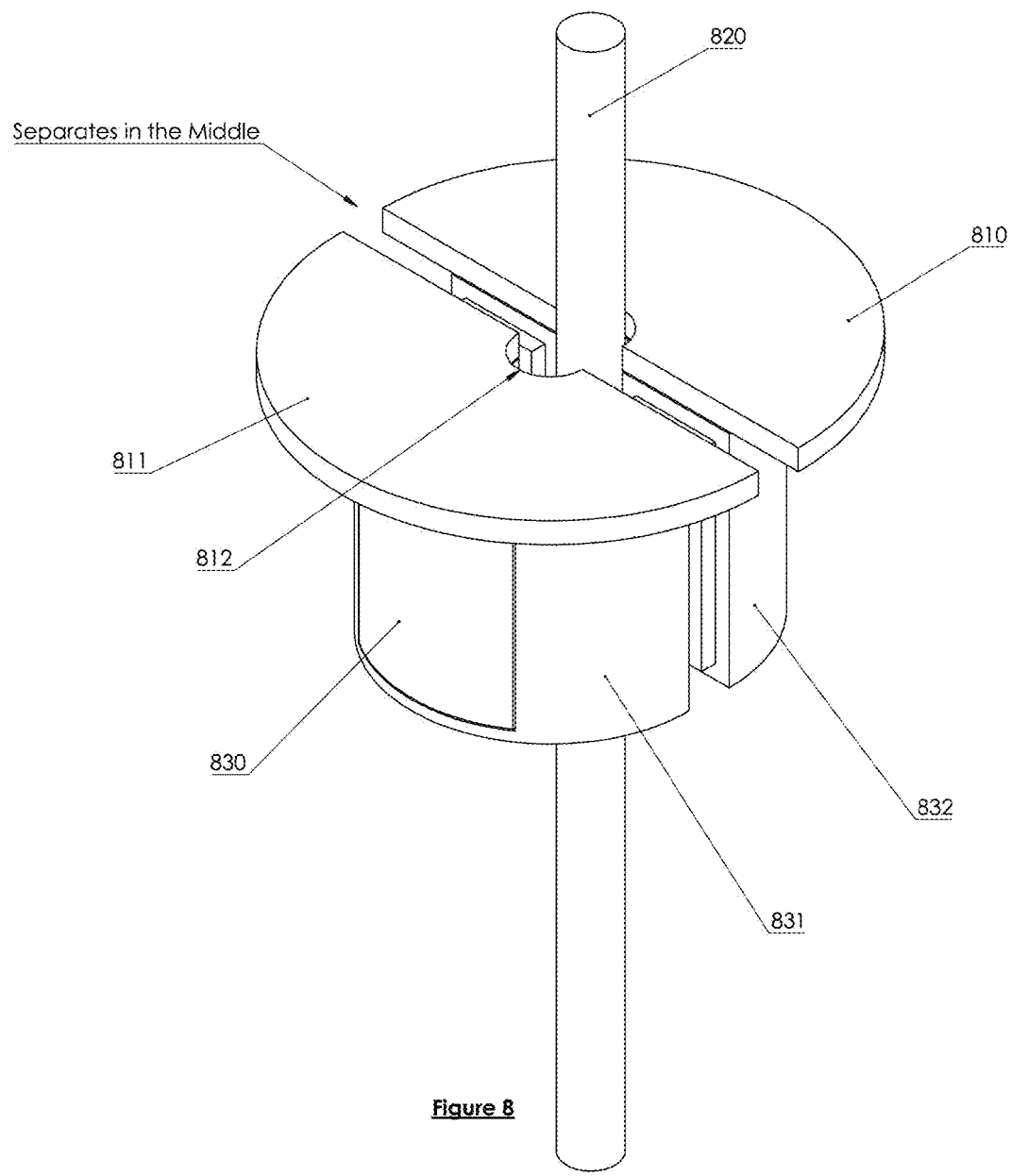
FIG. 8 illustrates a two-piece Sunbox and how it would attach or be positioned around a pole of an existing umbrella or parasol according to some embodiments.

FIG. 8 illustrates a two-piece Sunbox and how it would attach or be positioned around a pole of an existing umbrella or parasol according to some embodiments. In some embodiments, the protection and charging apparatus 800 may be two-pieces in order to easily attach to the central support assembly or pole 820 of the parasol or umbrella (and not have to slide up or down the pole 820). In some embodiments, the protection and charging apparatus 800 may include a second table top 810 and a second housing compartment 832 and first table top 811 and a first housing compartment 831. In some embodiments, the first table top 811 and the second table top 810 may have an opening 812 along an edge (e.g., a semi-circular opening) to allow the pole or central support assembly 820 to be aligned or positioned against the first housing compartment 831 and the second housing compartment 832. In some embodiments, the first housing compartment 831 may also be attached, connected or coupled to the second housing compartment 832. In some embodiments, the first housing compartment 831 may include a door 830 that has a bottom or side hinge that can be opened or closed to access or protect personal users' belongings or mobile communication devices. In some embodiments, the second housing compartment 832 may also have a door (not shown) that has a bottom or side hinge that may be opened or closed.

Figure 9:
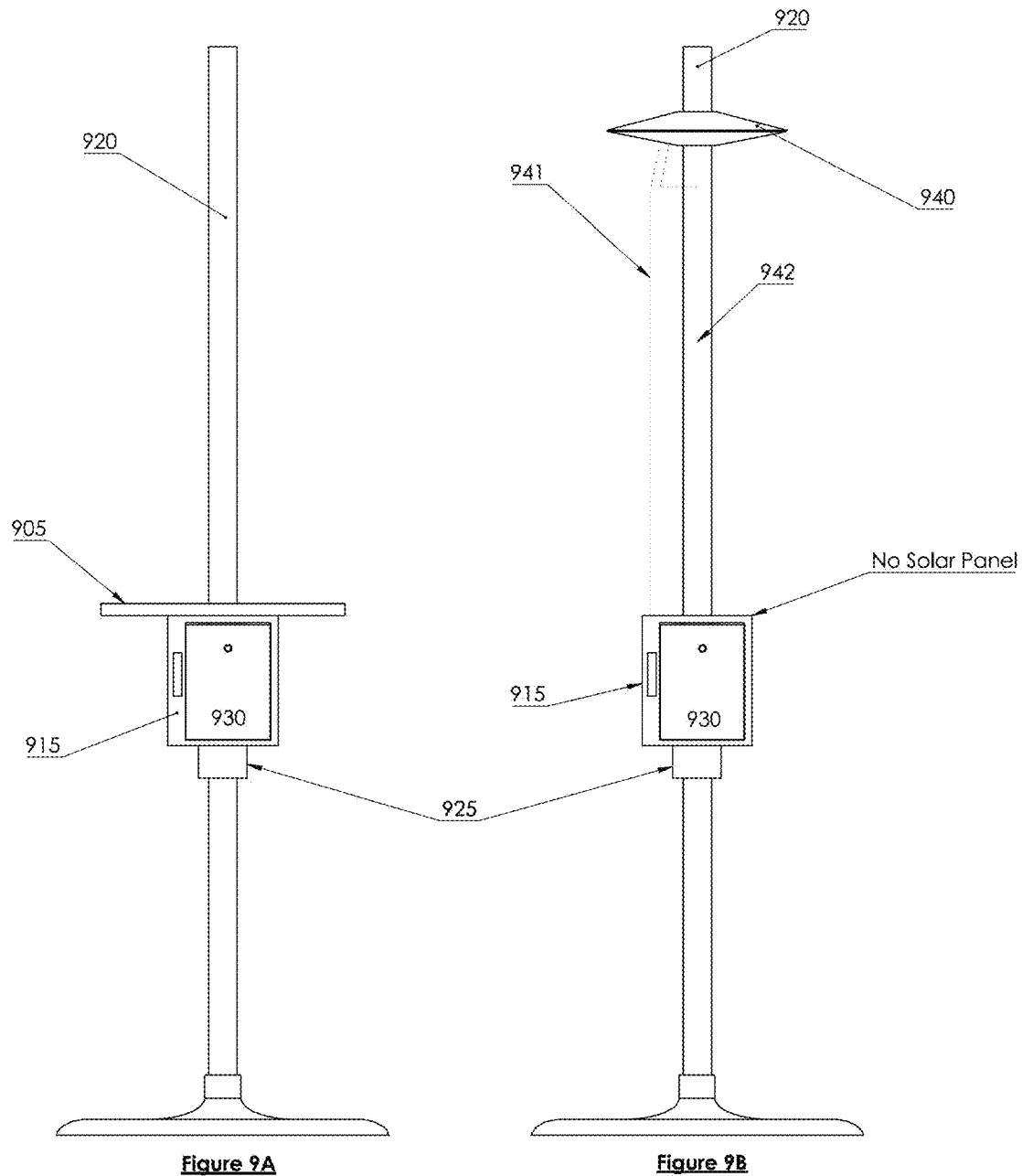
FIG. 9A illustrates a Sunbox having one or more solar panels located on a table top according to some embodiments
FIG. 9B illustrates a Sunbox having one or more solar panels located in a different location according to some embodiments.

FIG. 9A illustrates a Sunbox having one or more solar panels located on a table top according to some embodiments. In some embodiments, the protection and charging apparatus may be attached to the central support assembly or pole 920 of a parasol. In some embodiments, the protection and charging apparatus may comprise a table top and a box or housing 915. In some embodiments, the box or housing 915 may have a door 930 to allow users to access or store personal belongings or mobile communication devices that are stored or placed in an interior of the box or housing 915. In some embodiments, a connection assembly 925 may be utilized to tighten the protection and charging apparatus against the central support assembly or pole 920. In some embodiments, the one or more solar panels or cells 905 may be located on a table top (e.g., a top surface of the table top). In some embodiments, the one or more solar panels or cells 905 may generate power for other components or assemblies of the protection and charging apparatus. FIG. 9B illustrates a Sunbox having one or more solar panels located in a different location according to some embodiments. In some embodiments, the one or more solar panels or cells may be part of a solar generation apparatus 940. In some embodiments, the solar generation apparatus may be attached to an upper portion of the central support assembly or pole 920 (which is a higher vertical position on the pole as compared to the box or housing 915). In some embodiments, the solar generation apparatus 940 may track the location of the sun during the day. In some embodiments, one or more power cables may connect the solar generation apparatus 940 to the box or housing 915 in order to provide power to the box or housing 915 (e.g., the power source or rechargeable batteries). In some embodiments, a connector cable 941 may run along an outside of the parasol pole 920, as illustrated in FIG. 9B. In some embodiments, a connector cable 942 may run inside a parasol pole 920 in order to provide power from the solar generation apparatus 940 to the one or more power sources or batteries).

Figure 16:
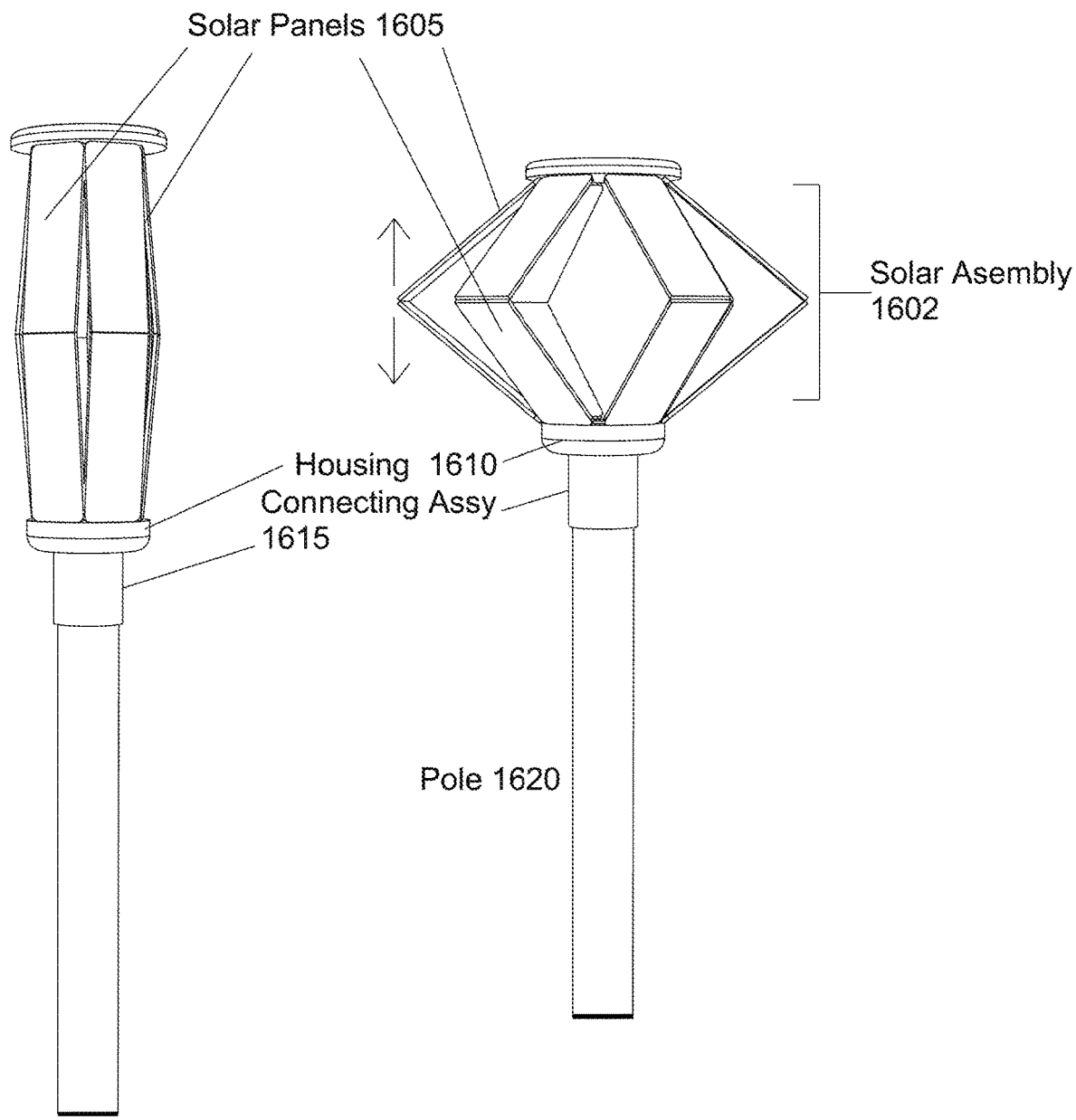
FIG. 16 illustrates a solar charging apparatus or assembly according to some embodiments.

FIG. 16 illustrates a solar charging apparatus or assembly according to some embodiments. In some embodiments, the solar generation apparatus or assembly 1602 may be attached to a central support assembly or pole 1620. In some embodiments, the solar generation apparatus or assembly 1602 may move and track the sun in order to generate a larger amount of electricity or power. In some embodiments, the solar generation apparatus 1602 may comprise a number of solar panels 1605. In some embodiments, there may be eight solar panels 1605, as is shown in FIG. 16. In some embodiments, a connection assembly 1615 may connect, couple or attach a housing 1610 (and/or the one or more solar panels 1605) to a parasol pole 1620. In some embodiments, the housing 1610 may comprise a motor and/or a gearing assembly (not shown) that move the one or more solar panels to different positions. In some embodiments, solar generation apparatus or assembly 1602 may comprise one or more processors, one or more memory devices, computer-readable instructions stored in the one or more memory devices and executable by the one or more processors, and/or one or more wireless communication transceivers (e.g., BLE transceivers). In some embodiments, computer-readable instructions executable by one or more processors may generate a signal, command, message or instruction and communicate it to the motor to move the one or more solar panels to position. In some embodiments, the command, message and/or instruction may be received via the one or more wireless communication transceivers from a mobile communication device and/or from a protection and/or charging device (e.g., Sunbox). In some embodiments, the solar generation apparatus or assembly 1602 may further comprise a timer and/or real-time clock. In some embodiments, at certain times of the day, a timer or real-time clock may expire and may communicate that the one or more solar panels 1605 on the solar panel should be moved in order to maximize a surface of the one or more solar panels 1605 that is capturing the light of the sun. In some embodiments, the gearing assembly may be a right-angle gearing assembly. On the left side of FIG. 16, the one or more solar panels or cells 1605 may be positioned in a vertical position that is perpendicular to the group or in a parallel plane with the pole or center support assembly 1620 of the parasol. In this position, as shown by the left side of FIG. 16, the solar generation apparatus 1602 may be able to capture more light from the sun during the morning and/or the late afternoon when the sun is lower on the horizon. On the right side of FIG. 16, the one or more solar panels or cells may be positioned between 20 to 70 degrees with respect to the parasol pole 1620. In some embodiments, the motor and gearing assembly may move the one or more solar panels or cells 1605 to a position that will capture the sun when the sun is overhead (e.g., from 9 am to approximately 3 pm on most days). As can be seen by the right-hand side of FIG. 16, the position of the one or more solar panels or cells 1605 is configured and/or positioned to capture these light rays by being more aligned with the sun's position at those times of the day. This adaptability allows existing parasol poles to be fitted with this solar generation apparatus and be able to efficiently solar power for other apparatuses, assemblies or components that may exist on the parasol or attached to the parasol (e.g., like the Sunbox).

Figure 10:
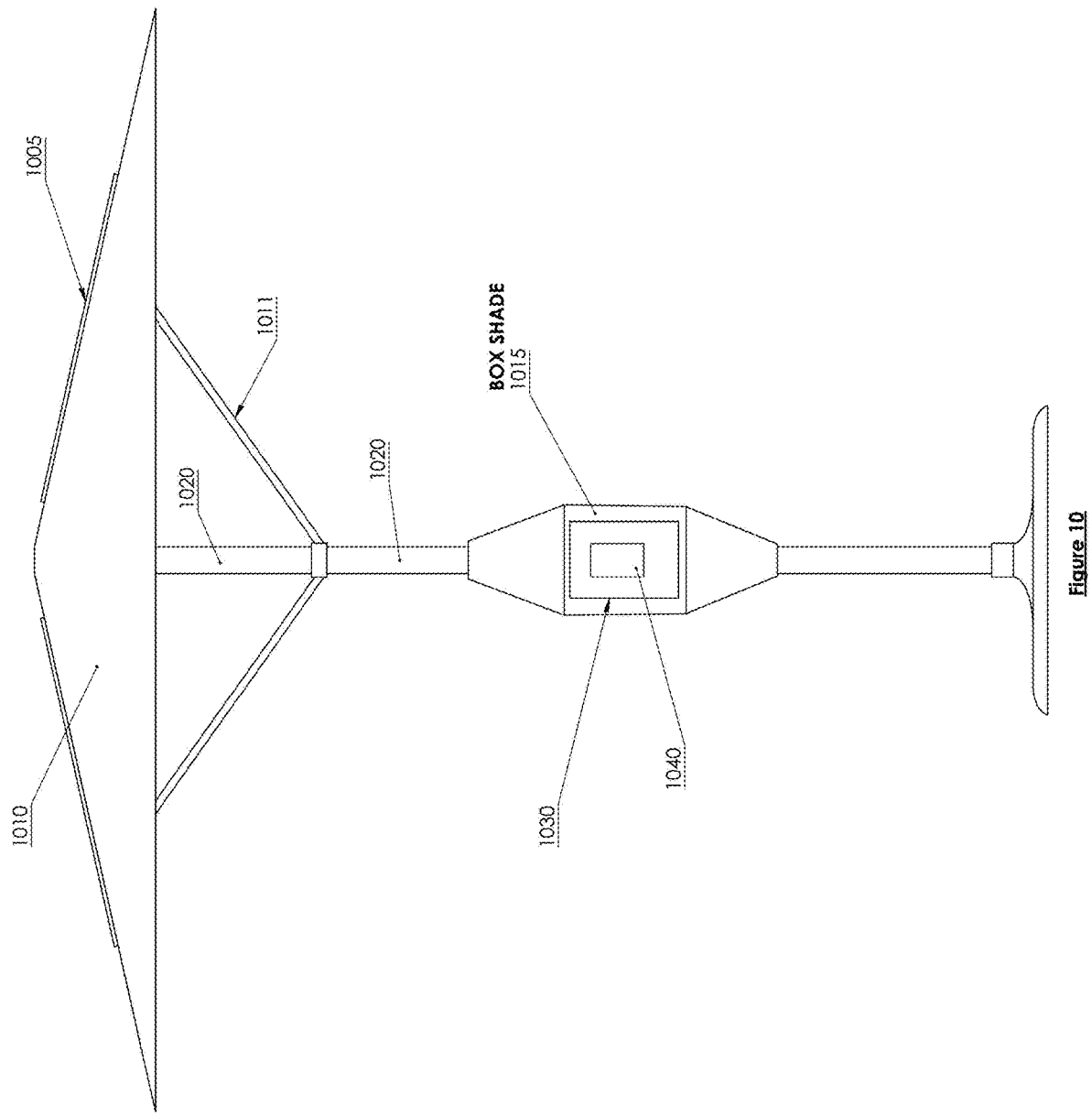
FIG. 10 illustrates a pre-assembled Sunbox that comes with an umbrella or parasol that is powered by one or more solar cells or solar panels that are positioned on the shading fabric and/or shading arms.

FIG. 10 illustrates a pre-assembled Sunbox that comes with an umbrella or parasol that is powered by one or more solar cells or solar panels that are positioned on the shading fabric and/or shading arms. In some embodiments, the parasol 1000 may include a shading fabric 1010, one or more shading arms or blades, one or more arm or blade support assemblies 1011, and a central support assembly or pole 1020. In some embodiments, the parasol 1000 may comprise one or more solar cells or arrays 1005 to generate power for a protection and charging apparatus 1000 (e.g., Sunbox). In some embodiments, the one or more solar cells or arrays 1005 may be attached to a shading fabric 1010 of the parasol and/or may be attached to the one or more arms or blades of the parasol. In some embodiments, a pre-assembled Sunbox 1015 may be attached, connected and/or coupled to the central support assembly or pole 1020. In some embodiments, the pre-assembled Sunbox 1015 may further include one or more doors 1030 and/or one or more keypads 1040. In some embodiments, the one or more solar cells or arrays 1005 may provide power to the pre-assembled Sunbox via one of the connection devices (e.g., cables) illustrated in FIG. 9B.

Figure 11:
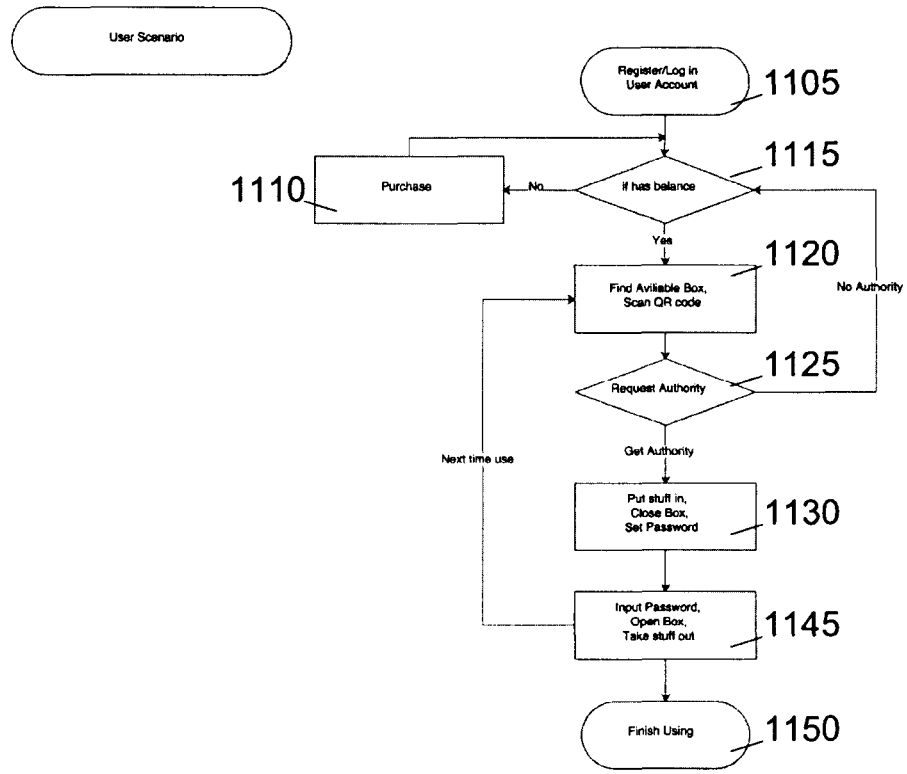
FIG. 11 illustrates a user scenario for utilizing a software application and a protection device or apparatus (e.g., a Sunbox) according to some embodiments.
Figure 12:
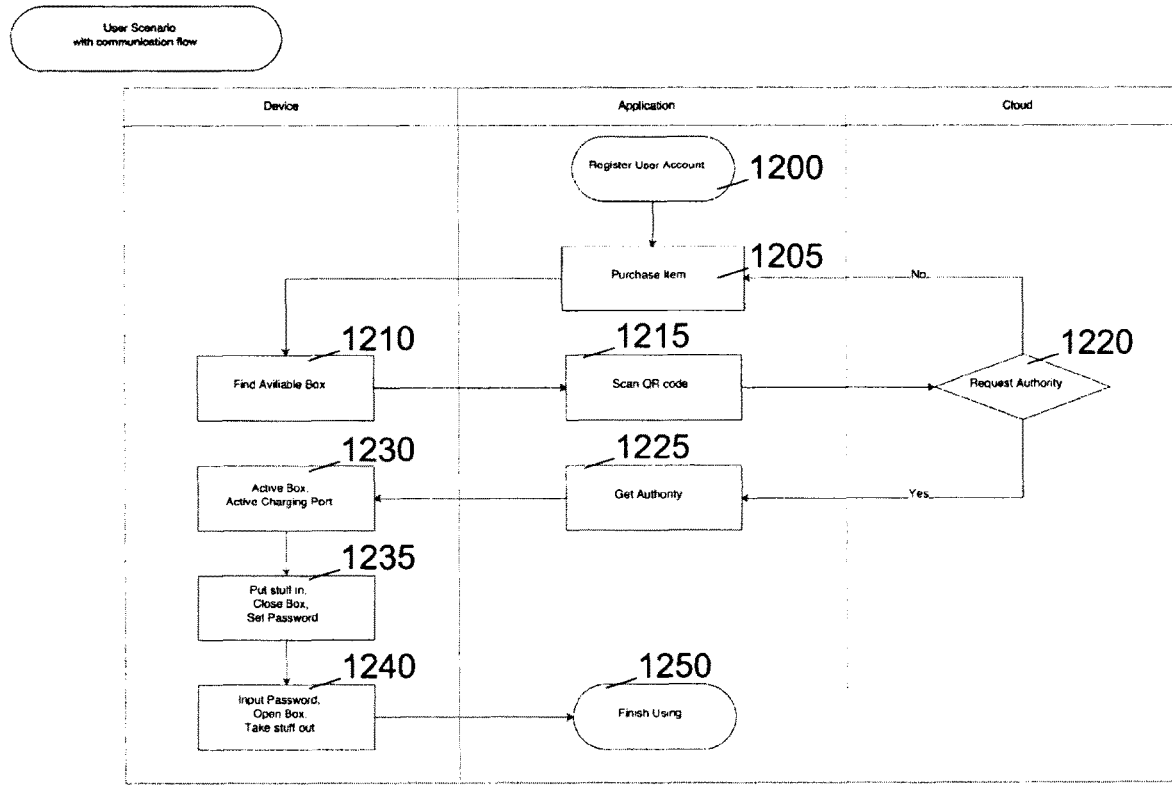
FIG. 12 illustrates a user scenario for utilizing a software application and a protection device and shows the dataflow between a Sunbox, a software application and/or a cloud-based server according to some embodiments.
Figure 13:
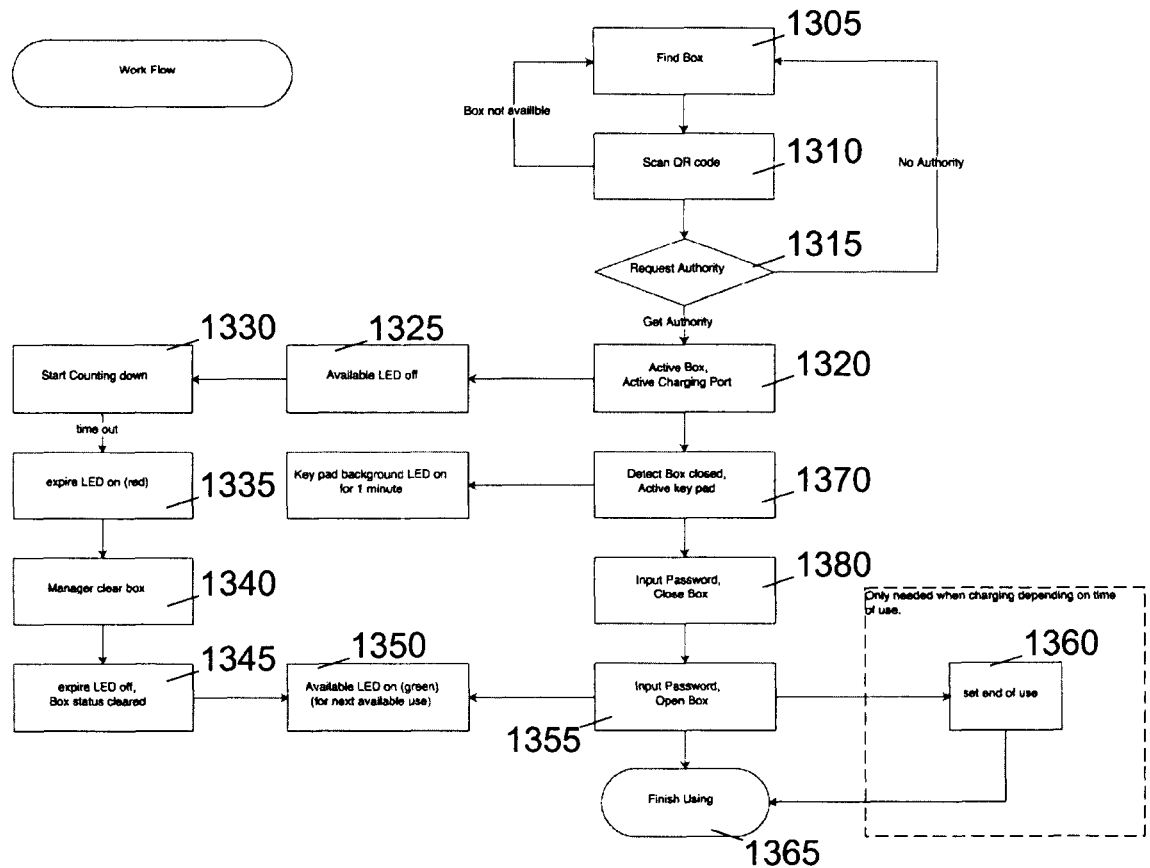
FIG. 13 illustrates the work flow from the point of view of finding a box and the difference lights, codes, and activities that need to be completed at the Sunbox in order to utilize the Sunbox according to some embodiments.

FIG. 11 illustrates a user scenario for utilizing a software application and a protection device or apparatus (e.g., a Sunbox) according to some embodiments. In some embodiments, a user account may purchase time, may find an available Sunbox, may scan the Sunbox's QR code, request authority to utilize the Sunbox, place materials in the Sunbox, put the personal belongings in, close the Sunbox, set a password, later input the password, open the Sunbox and take the personal belongings out. FIG. 12 illustrates a user scenario for utilizing a software application and a protection device and shows the dataflow between a Sunbox, a software application and/or a cloud-based server according to some embodiments. This illustrates that the software application involves the user account, purchasing a Sunbox, scanning a QR code, requesting utilization authority and closing the application. FIG. 13 illustrates the workflow from the point of view of finding a box and the difference lights, codes, and activities that need to be completed at the Sunbox in order to utilize the Sunbox according to some embodiments.

In some embodiments, users or visitors may establish an account in a Suncharge software system. In some embodiments, the Suncharge software system keeps track of an amount of currency or money that the user has for paying for power to charge their mobile communication devices. The total Suncharge system includes Suncharge software stored on one or more server computing devices that keeps track of a network of personal belongings protection systems (e.g., Sunboxes) as well as charging systems (e.g., Suntables) and allows them to be utilized by users and/or operators that have enrolled to be part of the Suncharge system by setting up an account on the cloud-based Suncharge system.

FIG. 11 illustrates a user scenario in operating Sunboxes according to some embodiments. In some embodiments, in step 1105, a user or operator may login to their Suncharge account on the Suncharge server computing device. In some embodiments, the Suncharge software application, in step 1115, may check to see if the user has a balance in their Suncharge account. In some embodiments, if the user's account does not have a balance, the user may input a credit card, a checking account, a debit card or other electronic form of payment (e.g., Venmo, Paypal (etc.)) in order to purchase, in step 1110, additional money for the account. In some embodiments, in the user's account has a balance, the user may locate a Sunbox in order to protect their personal belongings and/or to charge their mobile communication devices. In some embodiments, in step 1120, a user or operator may locate an available Sunbox, and may scan the QR code on located Sunbox. In some embodiments, by scanning the QR code, in step 1125, the Suncharge software application communicates with the Suncharge server computing device and verifies that the user has an account and an acceptable balance in order to pay for a time period of protecting their personal belongings in a Sunbox and/or charging their mobile communication device in a Sunbox. If the Suncharge software application determines the user has authority to rent or purchase time, in step 1130, the user may put their personal belongings in the Sunbox, close the Sunbox (e.g., the door on the Sunbox), and/or set a password of the Sunbox via, for example, a keypad. In some embodiments, in step 1145, the user may return to the Sunbox, open the box (e.g., utilizing the password or code on a keypad) and take their personal belongings out of the Sunbox. In some embodiments, in step 1150, this means that the user has finished using the Sunbox.

FIG. 12 illustrates a user scenario including a communication flow in some embodiments. The Figure illustrates what is occurring in the Sunbox software application, what is occurring in the Sunbox server computing device and/or what is occurring at the one or more Sunbox devices. In some embodiments, in step 1200, a user may create an account and purchase a certain amount of time to rent the Sunbox or may login to an already existing account. In some embodiments, in the Suncharge software application, may allow a user, in step 1205, to purchase amounts of time for the Sunbox (or the user could purchase an unlimited amount of time for a time period (e.g., $ 100 for a month). In some embodiments, in step 1210, a user or operator may locate or find (e.g., physically or electronically) an available Sunbox to protect their personal belongings and/to charge their mobile communication device. In some embodiments, in step 1215, after locating an available Sunbox, the user may, in step 1215, utilizing the Suncharge software application, scan a QR code (or other code or indicia) in order to communicate with the Suncharge server computing device. In some embodiments, in step 1220, the Suncharge software application, in communication with the Suncharge server computing device may request authority to be able to rent the located Sunbox. In some embodiments, in step 1225, the Suncharge software application, in conjunction with the Suncharge server computing device, may obtain authority form the Suncharge server computing device to be able rent the Sunbox. In some embodiments, the Suncharge server computing device may check the user's account balance as well as checking the Sunbox's availability (for example, someone could have preregistered for an upcoming timeframe for the Sunbox). In some embodiments, in step 1230, the Sunbox may be activated and/or the charging port may be activated. In some embodiments, in step 1235, the user may put their personal belongings in the Sunbox, close the Sunbox and/or enter in a password in a keypad for the Sunbox. In some embodiments, after the user is done protecting their personal belongings and/or charging their mobile communication device, in step 1240, the user may input the password into the Sunbox keypad and take their personal belongings out. In some embodiments, in step 1250, the user may finish utilizing the Sunbox.

In some embodiments, as discussed before, the Sunbox may comprise one or more processors and/or one or more wireless communication transceivers (e.g., BLE transceivers and/or WiFi (802.11) transceivers). In some embodiments, the one or more wireless communication transceivers may communicate Sunbox parameters, status parameters and/or measurements to one or more mobile communication devices and/or to one or more Suncharge server computing devices. In some embodiments, this allows the Suncharge application software and/or the Suncharge server computing device to monitor availability and/or status of a network of Sunboxes (either for a venue or hospitality network) or for a large number of Sunboxes.

FIG. 13 illustrates a workflow for utilizing Sunboxes according to some embodiments. In some embodiments, in step 1305, a visitor or user may find a Sunbox that the visitor would like to rent or utilize. In some embodiments, in step 1310, a visitor or user may open a Suncharge software application and/or may scan a QR code (or other code printed on the Sunbox) to determine availability of the Sunbox for utilization. As discussed above, the Sunbox may be utilized to store personal belongings in an outdoor environment (e.g., a venue, the beach, a park, etc.) and/or may also be able to charge mobile communication devices. In some embodiments, in step 1315, the Suncharge software application on the visitor or user's mobile communication device, after scanning the QR code, may communicate with a Suncharge server computing device to request authority and/or approval to rent or utilize the Sunbox for either purpose and/or for both purposes. In some embodiments, the user or visitor may receive approval and/or authority from the Suncharge server computing device.

In some embodiments, in step 1320, in response to receiving approval or authority, the Sunbox may activate the Sunbox for use and/or may activate the charging port. In some embodiments, in step 1325, the Sunbox may turn the availability lighting element (LED) off to visually identify that the Sunbox is no longer available for rent. In some embodiments, Suncharge server computing device may transmit the amount of time purchase to the Sunbox. In some embodiments, in step 1330, a Sunbox timer may begin to count down from the amount of time purchased. In some embodiments, in step 1335, the one or more processors may communicate to an expiration lighting assembly (e.g., LED) to identify that the time has expired. In some embodiments, in step 1340, a manager or venue operator may then clear the Sunbox in case there are still contents in the Sunbox. In some embodiments, the Sunbox may communicate status updates (e.g., time remaining) to the user mobile communication device, the venue operator computing device and/or the Suncharge server computing device. In some embodiments, in step 1345, computer-readable instructions executable by the one or more processors may turn the expiration lighting assembly off and may also clear the Sunbox availability status. In some embodiments, computer-readable instructions executable by the one or more processor may turn on the availability lighting assembly in order to identify that the Sunbox is now available for use.

In some embodiments, the user or operator may place personal belongings into the Sunbox and/or may connect one or more mobile communication devices to charging ports in the Sunbox. In some embodiments, in step 1370, the Sunbox (or computer-readable instructions executable by the one or more processors of the Sunbox), may detect that the Sunbox and may activate the keypad. In some embodiments, the Sunbox (or computer-readable instructions executable by the one or more processors of the Sunbox), in step 1375, may turn on a background lighting assembly for a certain period of time (e.g., 1 minute) to allow a user to see the keypad of the Sunbox. In some embodiments, in step 1380, a user may input a password or pass code into the keypad and/or may close the Sunbox. In some embodiments, the Sunbox may then communicate the password and/or status of the Sunbox (availability, time remaining, what services are being utilized) to the user's mobile communication device, a venue operator's mobile communication device and/or the Suncharge server computing device. In some embodiments, the user may be done utilizing the Sunbox (or the time may have expired), in step 1355 may input a password into the keypad and if the correct password, may open the Sunbox. In some embodiments, the verification of the passcode entered in the keypad may happen locally (e.g., within the Sunbox by checking against the code stored in local memory devices) and in alternative embodiments, the verification of the passcode may happen remotely (e.g., by comparing against passcodes stored in remote Suncharge server computing devices). In some embodiments, if the user or operator is on a minute plan or a time based plant, in step 1360, the Sunbox may communicate the amount of time utilized for charging and/or storage to the Suncharge server computing device so that the user's account can be updated. In some embodiments, in step 1370, the user may no longer utilize the Sunbox.

Figure 14:
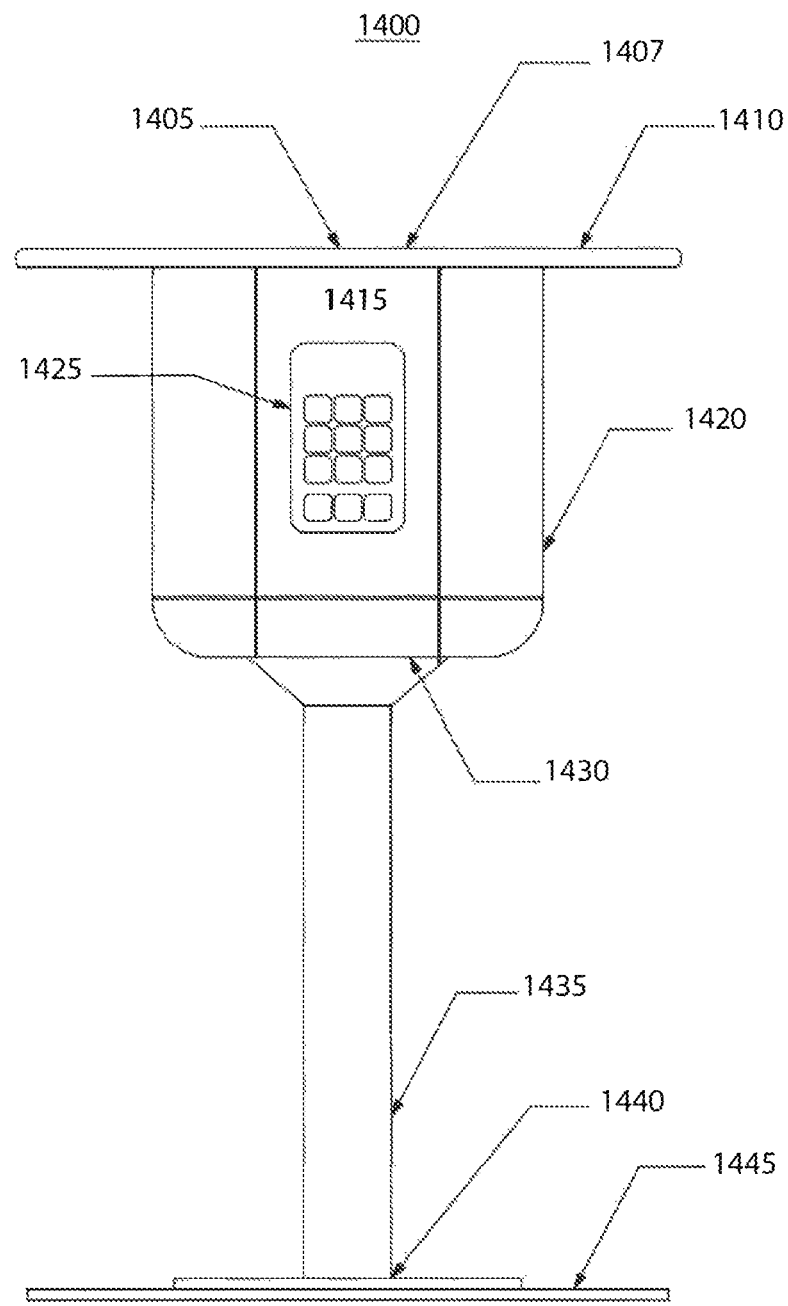
FIG. 14 illustrates a standalone Sunbox (e.g., an apparatus to protect personal belongings and to charge mobile communications device) according to some embodiments.

FIG. 14 illustrates a standalone Sunbox (e.g., an apparatus to protect personal belongings and to charge mobile communications device) according to some embodiments. In some embodiments, the standalone protection and charging apparatus 1400 may comprise one or more solar panels 1405, a table top 1410, a box enclosure or housing 1420, a door 1415, and/or a keypad 1425. In some embodiments, the standalone protection and charging apparatus 1400 may comprise a housing connection assembly 1430, a stem or central support assembly 1435, a stem attachment assembly 1440 and/or a base or base assembly 1445.

In some embodiments, the standalone protection and charging apparatus 1400 may convert sunlight into electrical power (e.g., voltage or current) via the one or more solar panels 1405 or solar cells located and/or positioned on the table top 1410. In some embodiments, the one or more solar panels 1405 may be installed and/or positioned on a top surface of the table top 1410. In some embodiments, the standalone protection and charging apparatus 1400 may comprise a transparent covering or surface 1407 that coves and/or protects the one or more solar panels 1405 or cells. In some embodiments, a bottom surface of the table top 1410 may connect to a top surface of the box enclosure or housing 1420. In some embodiments, the box enclosure or housing 1420 may comprise one or more doors or door assemblies 1415 that allow access to an interior of the box enclosure or housing 1420. In some embodiments, the keypad 1425 may allow or prevent access to the box enclosure or housing 1420 by locking or unlocking the door 1415 via a code. In some embodiments, the interior of the box enclosure or housing 1420 may include one or more universal serial bus (USB) charging ports for charging mobile communication devices. In some embodiments, the interior of the box enclosure or housing 1420 may include one or more inductive charging coils for charging mobile communication devices. In some embodiments, the interior of the box enclosure or housing 1420 may include one or more lighting elements to provide light to the interior of the box enclosure or housing 1420.

In some embodiments, the box enclosure or housing 1420 may be connected to the stem assembly or central support assembly 1435 via a housing connection assembly 1430. In some embodiments, the stem assembly or central support assembly 1435 may be a tube, shaft or circular pole. In some embodiments, the stem assembly or central support assembly 1435 may be attached to a base assembly 1445 via an attachment assembly 1440. In some embodiments, the base assembly 1445 may be in contact with a ground surface, whether it be grass, sand and/or dirt.

Figure 15:
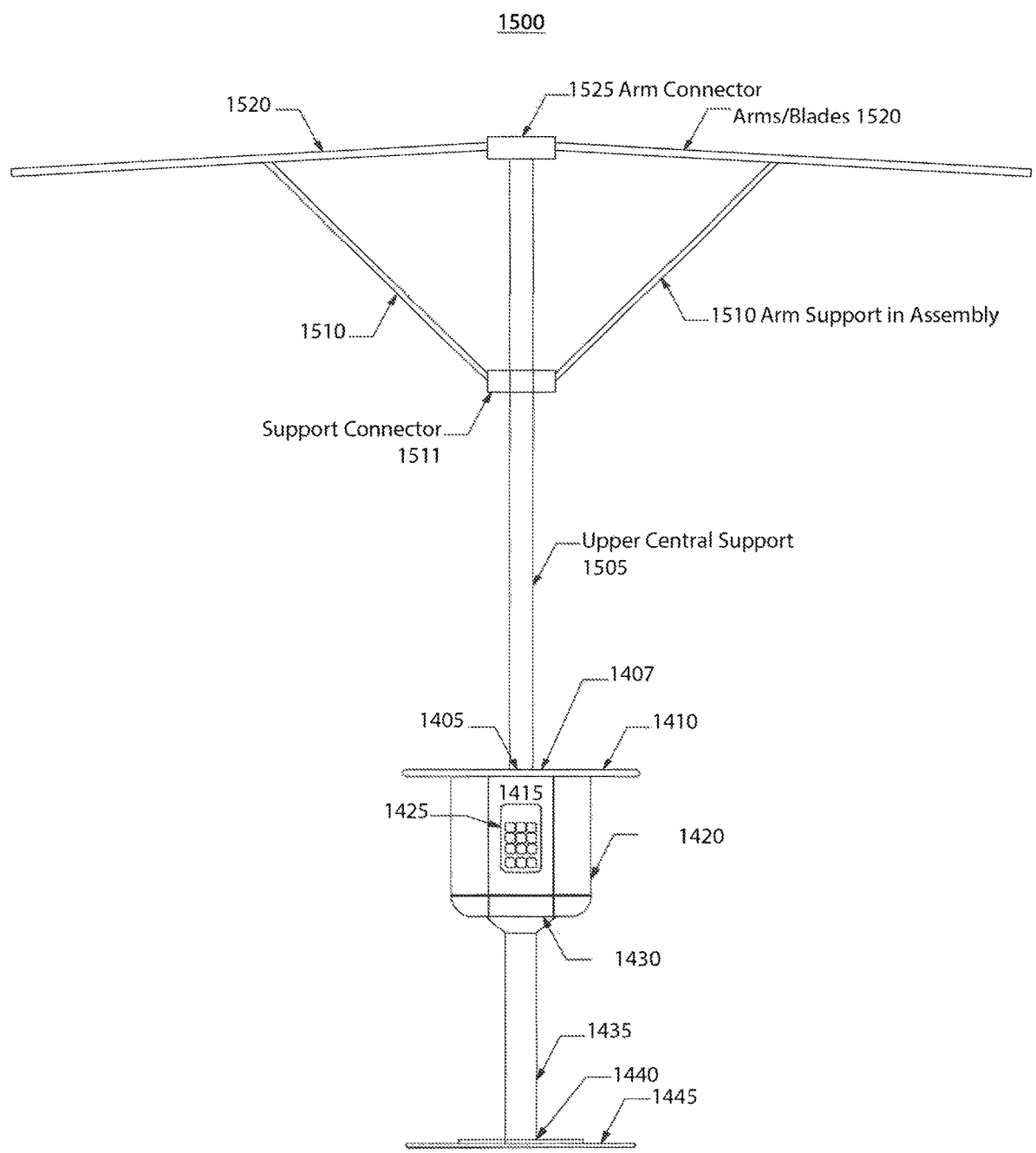
FIG. 15 illustrates a Sunbox (protection and charging apparatus) attached to a parasol pole according to some embodiments.

FIG. 15 illustrates a parasol with a Sunbox (the standalone protection and charging apparatus) according to some embodiment. In some embodiments, the parasol may not have a base. In some embodiments, the parasol may comprise an upper central support 1505, an arm support connector or connection assembly 1511, one or more arm support assemblies 1510 (e.g., two are shown in FIG. 15), one or more arms or blades 1520, and/or an arm connector or arm connector assembly 1526. In some embodiments, the parasol may be attached to a hole or opening in a center of the table top 1410. In some embodiments, the stem 1435 and the upper central support 1505 may be a unitary piece and the box enclosure or housing 1420 and table top 1410 may be attached to the stem 1435 and the upper central support 1505. In some embodiments, the stem 1435 and the upper central support 1505 may be a tubular piece or a round or oval shaft. In some embodiments, the arm support connector 1511 may couple and/or connect the one or more arm support assemblies 1510 to the upper central support or support assembly 1505. In some embodiments, the arm connector or connection assembly 1525 may couple or connect to the one or more arms or blades 1520 to the upper central support 1505. In some embodiments, the one or more arm support assemblies 1510 may be coupled or connected to the one or more arms or blades 1520 and the upper central support 1505 and may allow the one or arms may allow the arms or blades 1520 to be lifted to an open position or dropped to a closed position. In some embodiments, a shading fabric may be coupled and/or connected to the one or more arms or blades 1520. In some embodiments, the one or more arms/blades 1520 and/or the shading fabric may provide protection to the protection and charging device 1400 and keep environmental conditions (e.g., sun, wind and/or rain from impacting, eroding and/or damaging the protection and charging device.

The above disclosure is sufficient to enable one of ordinary skill in the art to practice the invention, and provides the best mode of practicing the invention presently contemplated by the inventor. While there is provided herein a full and complete disclosure of the preferred configurations of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A protection and/or charging assembly, comprising:
   a power apparatus to provide power to components of the protection and/or charging assembly;
   a protection housing, the protection housing to house one or more personal belongings and/or electronic devices;
   a charging apparatus to receive power from the power apparatus and to charge the one or more electronic devices;
   a locking assembly, the locking assembly to lock and/or unlock the protection housing and allow the one or more personal belongings to be stored in an interior of the protection housing; and
   one or more processors, one or more memory devices, one or more wireless communication transceivers, and computer-readable instructions, the computer-readable instructions executable by the one or more processors to allow the one or more wireless communication transceivers to receive commands, instructions, signals or messages from an external computing device,
   wherein the external computing device is a mobile communication device, the mobile communication device comprising one or more processors, one or more memory devices, computer-readable instructions and/or one or more wireless communication transceivers, the computer-readable instructions accessed from the one or more memory devices and/or executable by the one or more processors of the mobile communication device to utilize the one or more wireless communication transceivers:
- to communicate commands, instructions, signals or messages to the protection and/or charging assembly to control operations in protection and/or charging assembly,
- to allow a user to charge an electronic device placed in the protection housing by communicating one or more messages, signals, commands and/or instructions to the charging apparatus to provide power through a cable or wire to the electronic device in the protection housing;
- to allow a user to rent usage of the protection and/or charging assembly and to communicate one or more messages, signals, commands and/or instructions to the locking assembly of the protection and/or charging assembly to unlock the locking assembly to allow the user to place personal belongings in the interior of the protection housing and to lock the locking assembly once the personal belongings have been placed into the protection housing; and
- the mobile communication device further comprising a timer, wherein the timer determines if a rental time has expired and if the rental time has expired communicates a message to the mobile communication device that the rental time has expired and/or communications one or more messages, signals, commands and/or instructions to the protection and/or charging assembly to unlock the locking assembly and/or deactivate the charging assembly.

2. The protection and/or charging assembly of claim 1, further comprising:
one or more solar cells, the one or more solar cells to capture sunlight and convert the sunlight to electrical power, wherein the one or more solar cells are coupled to the one or more rechargeable batteries to provide the electrical power to charge the one or more rechargeable batteries, the one or more solar cells located on a flat horizontal surface that is located directly above the protection housing.

3. The protection and/or charging assembly of claim 1, wherein the one or more rechargeable batteries are connected to an external power source which provides power to charge the one or more rechargeable batteries.

4. The protection and/or charging assembly of claim 2, wherein the one or more solar cells are attached to an outer surface of the protection housing.

5. The protection and/or charging assembly of claim 4, wherein the one or more solar cells attached to an outdoor furniture piece or to a pole or a frame of a parasol or umbrella.

6. The protection and/or charging assembly of claim 1, wherein the computer-readable instructions further are executable by the one or more processors of mobile communication device to receive payment information from the user in order for the user to pay for the rental time that the user would like to use the protection and/or charging assembly.

7. The protection and/or charging assembly of claim 1, wherein the locking assembly is a computerized locking assembly that receives commands, signals, instructions and/or messages via the one or more wireless communication transceivers from the mobile communications device to lock or unlock the locking assembly to allow access to an interior of the protection housing.

8. The protection and/or charging assembly of claim 1, wherein the power apparatus includes one or more rechargeable batteries.

9. The protection and/or charging assembly of claim 8, wherein the one or more rechargeable batteries are connected to an external power source which provides power to charge the one or more rechargeable batteries.

10. The protection and/or charging assembly of claim 8, further comprising one or more solar cells, the one or more solar cells to capture sunlight and convert the sunlight to electrical power, wherein the one or more solar cells are coupled to the one or more rechargeable batteries to provide the electrical power to charge the one or more rechargeable batteries.

11. The protection and/or charging assembly of claim 1, wherein the locking assembly is a mechanical lock and a key is utilized to unlock or lock the locking assembly to allow access to an interior of the protection housing.

12. The protection and/or charging assembly of claim 1, further comprising a keypad, wherein the keypad is utilized to lock or unlock the locking assembly to allow access to an interior of the protection housing.

* * * * *